United States Patent
Kim et al.

(10) Patent No.: US 10,523,395 B2
(45) Date of Patent: Dec. 31, 2019

(54) METHOD FOR TRANSMITTING AND RECEIVING PHYSICAL UPLINK CONTROL CHANNEL BETWEEN TERMINAL AND BASE STATION IN WIRELESS COMMUNICATION SYSTEM AND APPARATUS FOR SUPPORTING SAME

(71) Applicant: LG Electronics Inc., Seoul (KR)

(72) Inventors: Seonwook Kim, Seoul (KR); Suckchel Yang, Seoul (KR); Yunjung Yi, Seoul (KR); Jaehyung Kim, Seoul (KR); Changhwan Park, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,654

(22) PCT Filed: Nov. 6, 2017

(86) PCT No.: PCT/KR2017/012458
§ 371 (c)(1),
(2) Date: Aug. 6, 2018

(87) PCT Pub. No.: WO2018/084661
PCT Pub. Date: May 11, 2018

(65) Prior Publication Data
US 2018/0331807 A1  Nov. 15, 2018

Related U.S. Application Data

(60) Provisional application No. 62/505,121, filed on May 12, 2017, provisional application No. 62/501,069, (Continued)

(51) Int. Cl.
*H04L 5/00* (2006.01)
*H04L 27/26* (2006.01)
(Continued)

(52) U.S. Cl.
CPC .......... *H04L 5/0053* (2013.01); *H04W 72/04* (2013.01); *H04L 5/0048* (2013.01)

(58) Field of Classification Search
CPC ...... H04L 5/0053; H04L 27/2613; H04J 1/14; H04B 1/7156; H04W 72/0413
See application file for complete search history.

(56) References Cited

U.S. PATENT DOCUMENTS 9,253,795 B2 * 2/2016 Fan ..................... H04W 4/70
2012/0127950 A1 * 5/2012 Chung ................ H04L 5/0055
370/329
(Continued)

FOREIGN PATENT DOCUMENTS

WO  WO2016093573   6/2016
WO  WO2016161629   10/2016

OTHER PUBLICATIONS

Nokia, Alcatel-Lucent Shanghai Beil;On the UL control channel structure for NR3GPP TSG-RAN WG1 #86 Bis Lisbon, Portugal,R1-1609740; (Year: 2016).*
(Continued)

*Primary Examiner* — Asghar H Bilgrami
(74) *Attorney, Agent, or Firm* — Fish & Richardson P.C.

(57) ABSTRACT

Disclosed are a method for transmitting and receiving a physical uplink control channel between a terminal and a base station in a wireless communication system, and an apparatus for supporting the same. More particularly, disclosed are a method for transmitting and receiving a physical uplink control channel through a plurality of channels between a terminal and a base station in a wireless communication system supporting transmission and reception of a physical uplink control channel through a single symbol, and an apparatus for supporting the same.

11 Claims, 23 Drawing Sheets

Related U.S. Application Data filed on May 3, 2017, provisional application No. 62/457,887, filed on Feb. 11, 2017, provisional application No. 62/454,072, filed on Feb. 3, 2017, provisional application No. 62/443,779, filed on Jan. 8, 2017, provisional application No. 62/423,473, filed on Nov. 16, 2016, provisional application No. 62/420,574, filed on Nov. 11, 2016, provisional application No. 62/417,417, filed on Nov. 4, 2016.

(51) Int. Cl.
  *H04B 1/7156* (2011.01)
  *H04W 72/04* (2009.01)

(56) References Cited

U.S. PATENT DOCUMENTS

| | | | |
|---|---|---|---|
| 2012/0155337 A1* | 6/2012 | Park | H04L 1/1692 370/280 |
| 2012/0320859 A1* | 12/2012 | Ahn | H04L 1/1607 370/329 |
| 2013/0279480 A1* | 10/2013 | Park | H04L 1/1861 370/335 |
| 2015/0016377 A1 | 1/2015 | Kim et al. | |
| 2015/0085723 A1* | 3/2015 | Chen | H04W 72/042 370/280 |
| 2016/0226639 A1 | 8/2016 | Xiong et al. | |
| 2018/0076917 A1* | 3/2018 | Pan | H04B 7/0639 |
| 2018/0098341 A1* | 4/2018 | Wang | H04L 5/0082 |
| 2018/0124815 A1* | 5/2018 | Papasakellariou | H04L 5/0053 |
| 2018/0132229 A1* | 5/2018 | Li | H04L 1/0013 |
| 2018/0249458 A1* | 8/2018 | He | H04L 1/1607 |

OTHER PUBLICATIONS

MediaTek Inc. Discussion on UL control channel design;3GPP TSG RAN WG1 Meeting #86bis Lisbon, Portugal ;RI-1609559 (Year: 2016).*

Intel Corporation, R1-1609536, UCI contents and UL control channel formats, 3GPP TSG RAN WG1 #86bis, Oct. 1, 2016. See section 1, 3-4 (Year: 2016).*

International Search Report in International Application No. PCT/KR2017/012458, dated Feb. 23, 2017, 11 pages.

MediaTek Inc., "Discussion on UL control channel design," 3GPP TSG RAN WG1 Meeting #86bis, dated Oct. 10-14, 2016, 14 pages.

Nokia et al., "On the UL control channel structure for NR," 3GPP TSG-RAN WG1 #86 Bis, dated Oct. 10-14, 2016, 7 pages.

Qualcomm Incorporated, "UL Design for Shortened TTI," R1-1610008, 3GPP TSG RAN WG1 #86b, Lisbon, Portugal, Oct. 10-14, 2016, 7 pages.

Ericsson, "Link level evaluation of PUCCH for short TTI," R1-161169, 3GPP TSG RAN WG1 Meeting #84, Malta, Feb. 15-19, 2016, 8 pages.

Extended European Search Report in European Application No. Appln. No. 17867981.7, dated Jul. 15, 2019, 8 pages.

3rd Generation Partnership Project; Technical Specification Group Radio Access Network;Evolved Universal Terrestrial Radio Access (E-UTRA); Physical Channels and Modulation (Release 8), "3GPP TS 36.211 V8.2.0 (Mar. 2008)," dated Mar. 2018, 70 pages.

* cited by examiner

FIG. 18

(a) PF1-symb7

(a) PF1-symb6A          (b) PF1-symb6B (a) PF1-symb5A          (b) PF1-symb5B          (c) PF1-symb5C (a) PF3-symb7

(a) PF3-symb6A  (b) PF3-symb6B (a) PF3-symb5A  (b) PF3-symb5B  (c) PF3-symb5C

FIG. 30
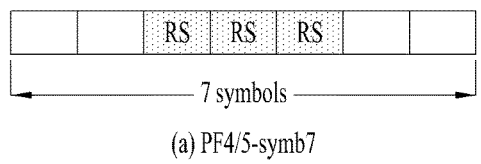
(a) PF4/5-symb7
FIG. 31
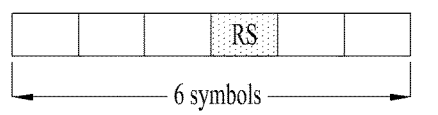   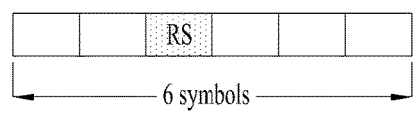
(a) PF4/5-symb6A     (b) PF4/5-symb6B
FIG. 32
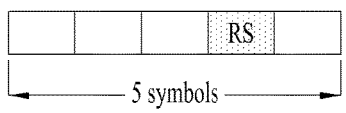  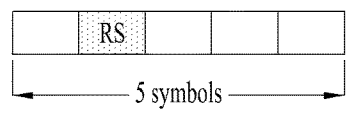  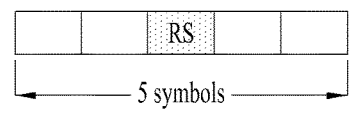
(a) PF4/5-symb5A   (b) PF4/5-symb5B   (c) PF4/5-symb5C

METHOD FOR TRANSMITTING AND RECEIVING PHYSICAL UPLINK CONTROL CHANNEL BETWEEN TERMINAL AND BASE STATION IN WIRELESS COMMUNICATION SYSTEM AND APPARATUS FOR SUPPORTING SAME

CROSS-REFERENCE TO RELATED APPLICATIONS

This application is a National Stage application under 35 U.S.C. § 371 of International Application No. PCT/KR2017/012458, filed on Nov. 6, 2017, which claims the benefit of U.S. Application No. 62/505,121, filed on May 12, 2017, U.S. Application No. 62/501,069, filed on May 3, 2017, U.S. Application No. 62/457,887, filed on Feb. 11, 2017, U.S. Application No. 62/454,072, filed on Feb. 3, 2017, U.S. Application No. 62/443,779, filed on Jan. 8, 2017, U.S. Application No. 62/423,173, filed on Nov. 16, 2016, U.S. Application No. 62/420,574, filed on Nov. 11, 2016, and U.S. Application No. 62/417,417, filed on Nov. 4, 2016. The disclosures of the prior applications are incorporated by reference in their entirety.

TECHNICAL FIELD

The following description relates to a wireless communication system, and more particularly, to a method for transmitting and receiving a physical uplink control channel between a terminal (or user equipment) and a base station and an apparatus supporting the same.

More specifically, the following description relates to a method for transmitting and receiving a physical uplink control channel through a plurality of channels between a user equipment and a base station in a wireless communication system supporting transmission and reception of a physical uplink control channel through one symbol, and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

An object of the present invention devised to solve the problem lies in a method for transmitting and receiving a physical uplink control channel between a user equipment and a base station in a newly proposed communication system.

In particular, it is an object of the present invention to provide a method for configuring a physical uplink control channel transmitted and received between a user equipment and a base station when the physical uplink control channel is transmitted and received between the user equipment and the base station through at least one symbol in a newly proposed communication system, and a method for transmitting and receiving a physical uplink control channel based thereon.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method and apparatuses for transmitting and receiving a physical uplink control channel between a user equipment and a base station in a wireless communication system.

In one aspect of the present invention, provided herein is a method for transmitting a physical uplink control channel (PUCCH) to a base station by a user equipment in a wireless communication system, the method including configuring a multi-symbol PUCCH to be transmitted through a plurality of symbols, using a plurality of PUCCH configurations each using one symbol, and transmitting the configured multi-symbol PUCCH through the plurality of symbols.

In another aspect of the present invention, provided herein is a method for receiving a physical uplink control channel (PUCCH) from a user equipment by a base station in a wireless communication system, the method including receiving a multi-symbol PUCCH from the user equipment through a plurality of symbols, wherein the multi-symbol PUCCH is configured using a plurality of PUCCH configurations each using one symbol.

In another aspect of the present invention, provided herein is a user equipment for transmitting a physical uplink control channel (PUCCH) to a base station in a wireless communication system, the user equipment including a transmitter, and a processor connected to the transmitter, wherein the processor is configured to configure a multi-symbol PUCCH to be transmitted through a plurality of symbols, using a plurality of PUCCH configurations each using one symbol, and transmit the configured multi-symbol PUCCH through the plurality of symbols.

In another aspect of the present invention, provided herein is a base station for receiving a physical uplink control channel (PUCCH) from a user equipment in a wireless communication system, the base station including a receiver, and a processor connected to the receiver, wherein the processor is configured to receive a multi-symbol PUCCH from the user equipment through a plurality of symbols, wherein the multi-symbol PUCCH is configured using a plurality of PUCCH configurations each using one symbol.

Herein, the PUCCH configuration using the one symbol may correspond to a PUCCH configuration in which a DM-RS and UCI are transmitted by performing frequency-division multiplexing (FDM) thereto through the one symbol.

In addition, when the PUCCH configurations using the one symbol are each configured with a plurality of uplink resource element groups (REGs) allocated to non-consecutive frequency resources, frequency hopping may not be applied to the multi-symbol PUCCH.

In contrast, when the PUCCH configurations using the one symbol are each configured with a plurality of uplink resource element groups (REGs) allocated to consecutive frequency resources, frequency hopping may be applicable to the multi-symbol PUCCH.

In addition, the multi-symbol PUCCH may be transmitted by applying frequency hopping thereto.

Specifically, when the number of symbols through which the multi-symbol PUCCH is transmitted is K (where K is a natural number greater than 1), and the multi-symbol PUCCH is transmitted by applying frequency hopping thereto, each frequency hopping unit may be divided into $$\left\lceil \frac{K}{2} \right\rceil$$

symbols and $$K - \left\lceil \frac{K}{2} \right\rceil$$

symbols. Here, ⌈a⌉ may denote a smallest integer greater than or equal to a.

Uplink control information (UCI) bit information transmitted in each symbol through which the multi-symbol PUCCH is transmitted may be identical or different depending on a size of UCI transmitted on the multi-symbol PUCCH.

Specifically, when the size of the UCI transmitted on the multi-symbol PUCCH is larger than or equal to a predetermined bit size, the UCI bit information transmitted in each symbol through which the multi-symbol PUCCH is transmitted may differ among the symbols.

In addition, the multi-symbol PUCCH may be transmitted through code division multiplexing (CDM) with a PUCCH transmitted by another user equipment.

In addition, the PUCCH configurations using the one symbol are PUCCH configurations in which a DM-RS and UCI may be transmitted by applying time division multiplexing (TDM) thereto through the one symbol.

In the present invention, the multi-symbol PUCCH may be a 2-symbol PUCCH.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, when a newly proposed wireless communication system (e.g., an NR system) supports transmission and reception of a physical uplink control channel through a variable number of symbols, the user equipment and the base station may transmit and receive the physical uplink control channel using an appropriate PUCCH structure according to the size of an uplink control channel to be transmitted and received through the physical uplink control channel.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 18 is a diagram illustrating a structure in which RS and UCI are subjected to FDM or FDM+TDM according to an exemplary embodiment of the present invention;

FIG. 30 is a diagram schematically illustrating a 7-symbol PUCCH transmission method according to the present invention;

FIG. 31 is a diagram schematically illustrating a 6-symbol PUCCH transmission method according to the present invention;

FIG. 32 is a diagram schematically illustrating a 5-symbol PUCCH transmission method according to the present invention;

BEST MODE

Figure 1:
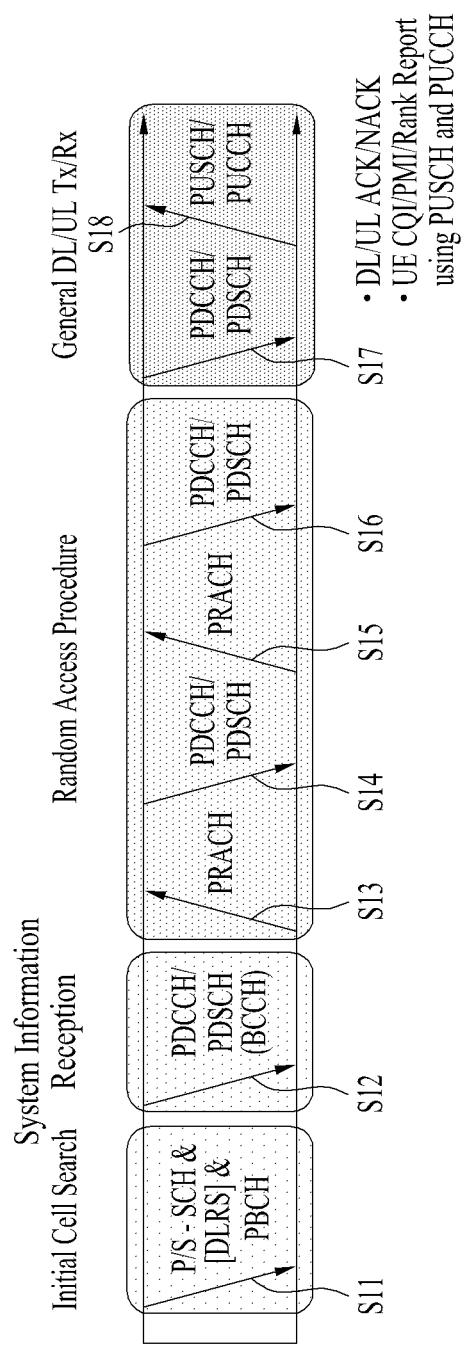
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), new generation Node B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
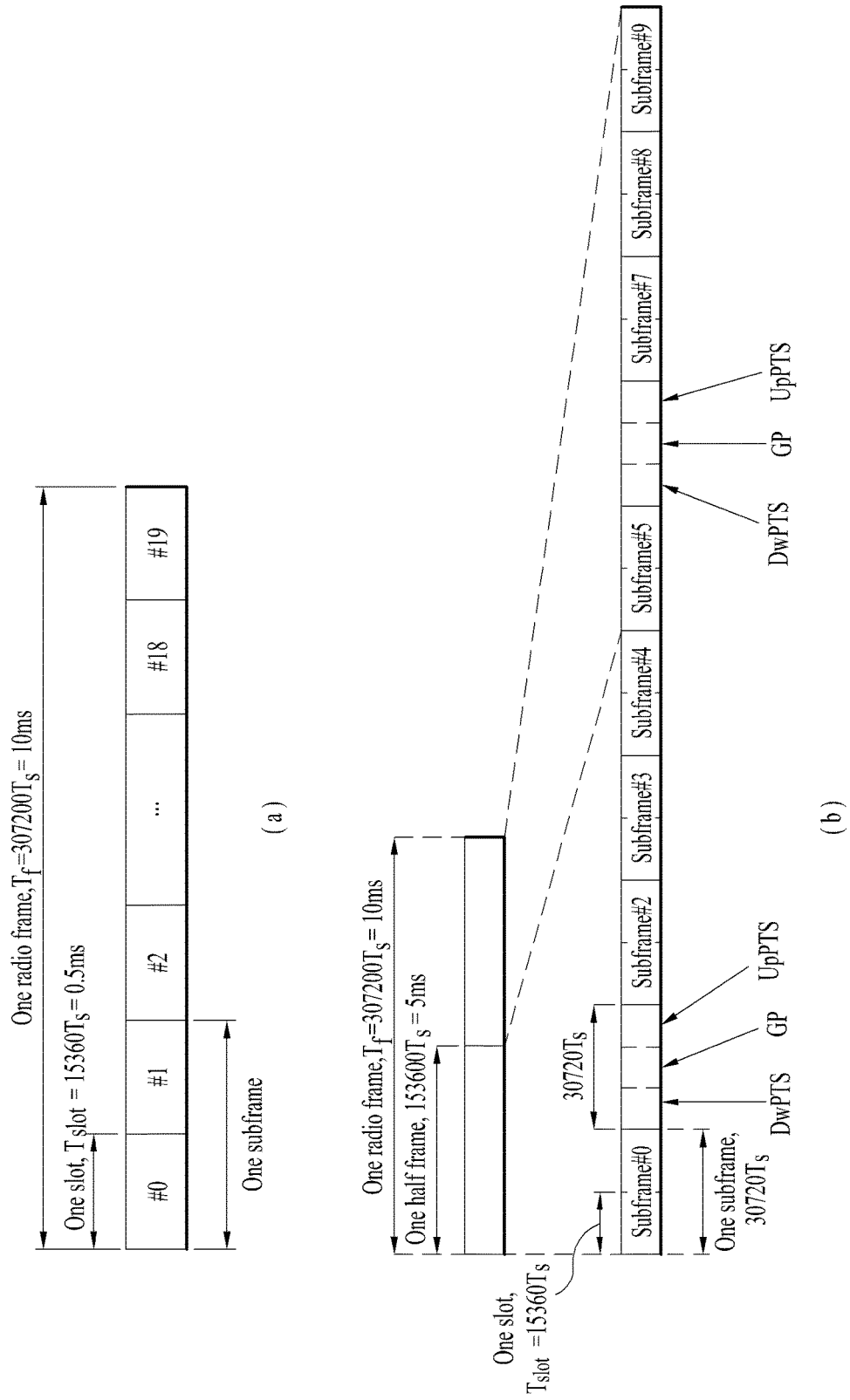
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($Tf=307200 \cdot Ts$) long, including equal-sized 20 slots indexed from 0 to 19. Each slot is 0.5 ms ($Tslot=15360 \cdot Ts$) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as $Ts=1/(15 \text{ kHz} \times 2048)=3.2552 \times 10\text{-}8$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 5:
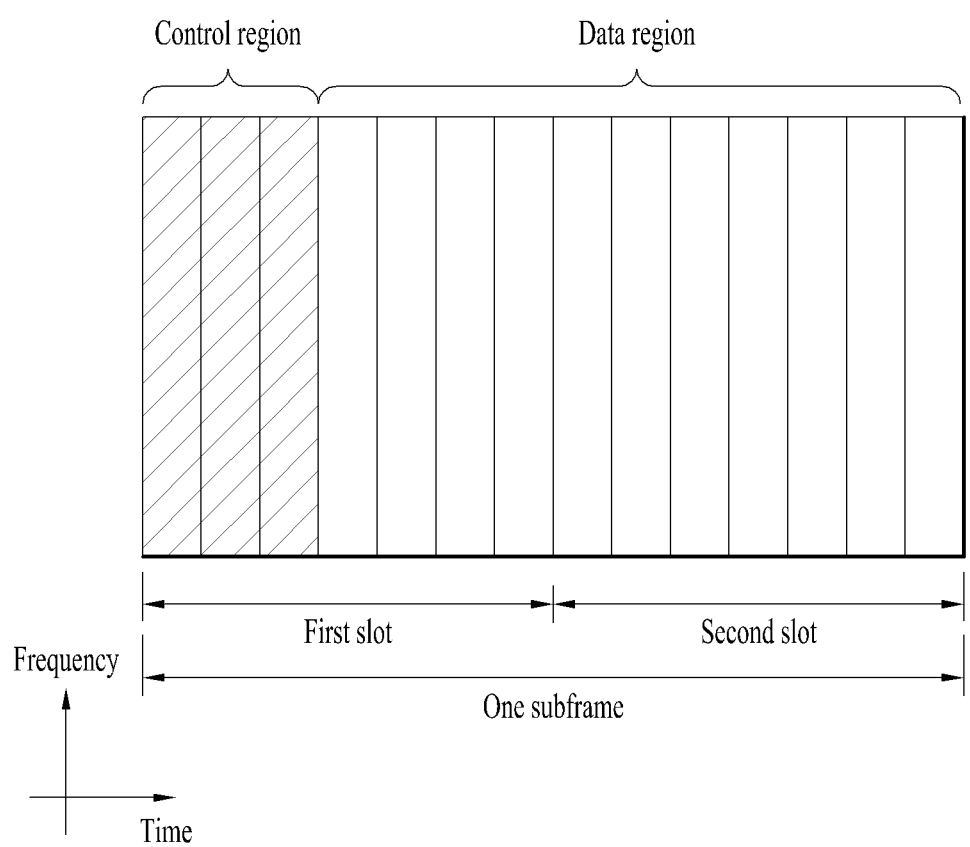
FIG. 5 is a diagram illustrating an exemplary structure of a downlink subframe.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
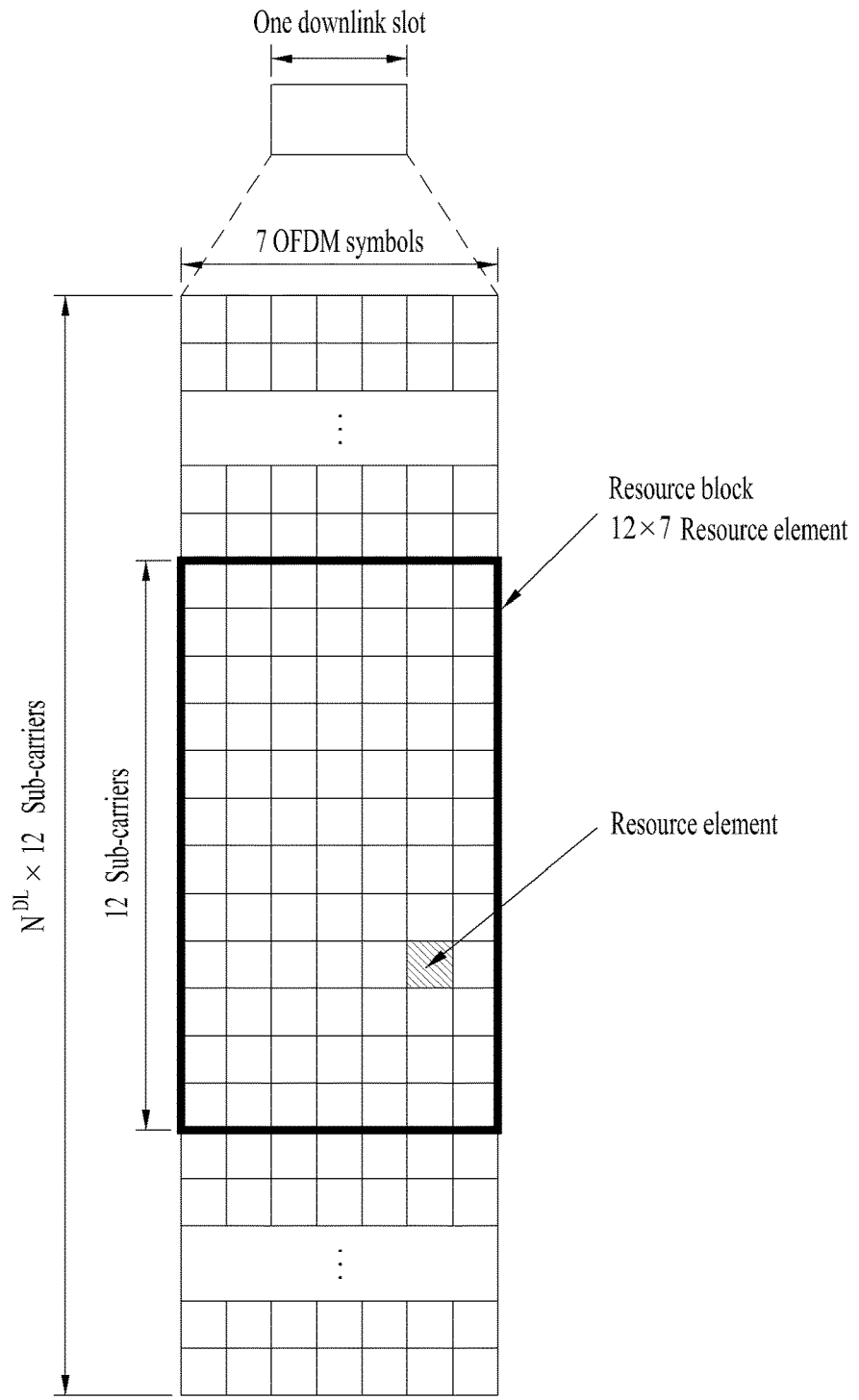
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
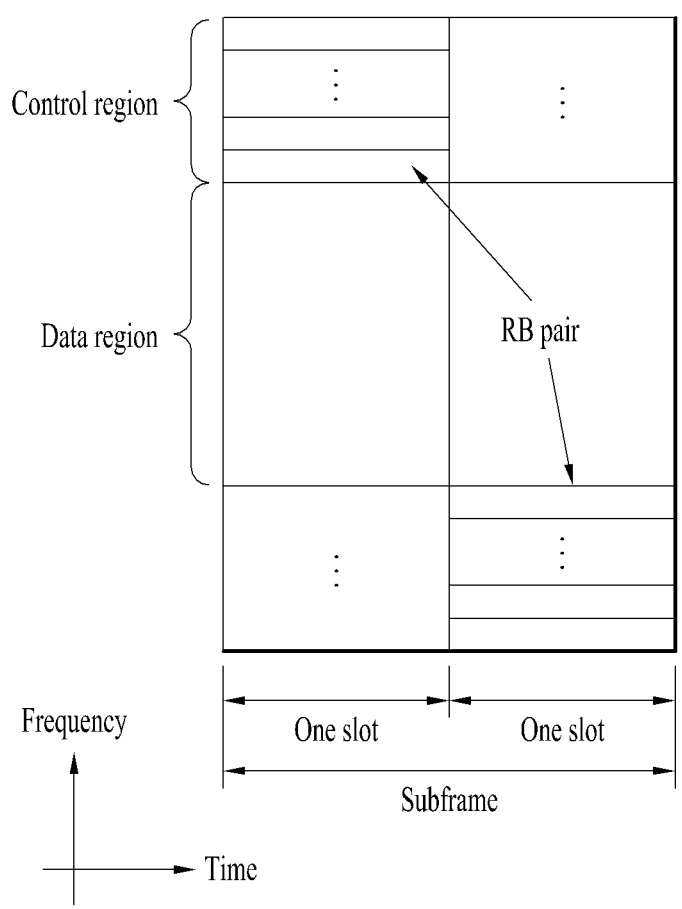
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

FIG. 5 illustrates a structure of a DL subframe that may be used in embodiments of the present disclosure.

1.4. RRM Measurement

LTE systems support radio resource management (RRM) operations including power control, scheduling, cell search, cell reselection, handover, radio link or connection monitoring, and connection establishment/re-establishment. In this operation, a serving cell may make a request to a UE for RRM measurement information, which is a measurement value for performing the RRM operation. As typical information, in an LTE system, a UE may measure information such as cell search information on each cell, reference signal received power (RSRP), and reference signal received quality (RSRQ) and report the same as typical information. Specifically, in the LTE system, the UE may receive 'measConfig' from the serving cell over a higher-layer signal for RRM measurement, and measure the RSRP or RSRQ according to the information of 'measConfig'.

Here, RSRP, RSRQ, and RSSI disclosed in the LTE system may be defined as follows.

First, reference signal received power (RSRP) is defined as the linear average over the power contributions (in [W]) of the resource elements that carry cell-specific reference signals within the considered measurement frequency bandwidth. For example, for RSRP determination the cell-specific reference signals Ro shall be used. If the UE can reliably detect that $R_1$ is available it may use $R_1$ in addition to Ro to determine RSRP.

The reference point for the RSRP shall be the antenna connector of the UE.

If receiver diversity is in use by the UE, the reported value shall not be lower than the corresponding RSRP of any of the individual diversity branches.

Reference Signal Received Quality (RSRQ) is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

Next, Received Signal Strength Indicator (RSSI) is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

In accordance with the definitions above, in the case of intra-frequency measurement, a UE operating in the LTE system may measure RSRP in the bandwidth indicated through the allowed measurement bandwidth-related information element (IE), which is transmitted on system information block type 3, in SIB3. Alternatively, in the case of inter-frequency measurement, the UE may measure RSRP in a bandwidth corresponding to one of 6, 15, 25, 50, 75, and 100 resource blocks (RBs) indicated through the allowed measurement bandwidth transmitted in SIB5. Alternatively, in the case where the IE is absent, the UE may measure RSRP in the frequency band of the entire downlink (DL) system as a default operation.

In this case, if the UE receives the information on the allowed measurement bandwidth, the UE may consider the corresponding value as the maximum measurement bandwidth and freely measure the RSRP value within the range of the corresponding value. However, if the serving cell transmits an IE defined as WB-RSRQ to the UE and the allowed measurement bandwidth is set to 50 RBs or more, the UE shall calculate the RSRP value for the entire allowed measurement bandwidth. In the RSSI measurement, the UE measures RSSI using the frequency band of the receiver of the UE according to the definition of the RSSI bandwidth.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as New RAT or NR (New Radio).

2.1. Self-Contained Subframe Structure

Figure 11:
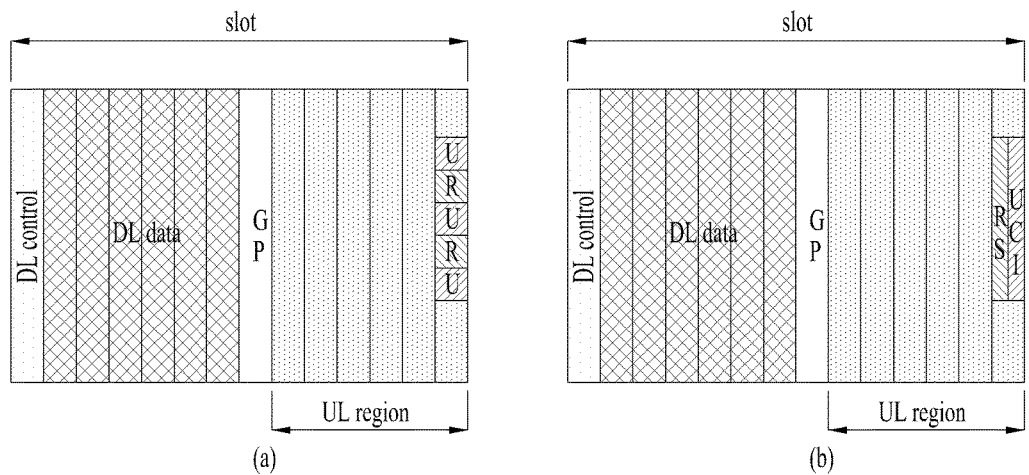
FIG. 11 is a diagram illustrating a one-symbol PUCCH structure according to an exemplary embodiment of the present invention.

FIG. 11 is a diagram illustrating a self-contained subframe structure applicable to the present invention.

In the NR system to which the present invention is applicable, a self-contained subframe structure as shown in FIG. 11 is proposed in order to minimize data transmission latency in the TDD system.

In FIG. 11, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 11.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The NR system uses the OFDM transmission scheme or a similar transmission scheme. Here, the NR system may typically have the OFDM numerology as shown in Table 2.

TABLE 2

| Parameter | Value |
| --- | --- |
| Subcarrier-spacing (Δf) | 75 kHz |
| OFDM symbol length | 13.33 μs |
| Cyclic Prefix (CP) length | 1.04 μs/0.94 μs |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 3. Specifically, as disclosed in Table 3, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the NR system according to the present invention, and the values thereof may depend on the implementation method.

TABLE 3

| Parameter | Value | Value | Value | Value |
| --- | --- | --- | --- | --- |
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix (CP) length | 5.20 μs/ 4.69 μs | 2.60 μs/ 2.34 μs | 1.30 μs/ 1.17 μs | 0.65 μs/ 0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
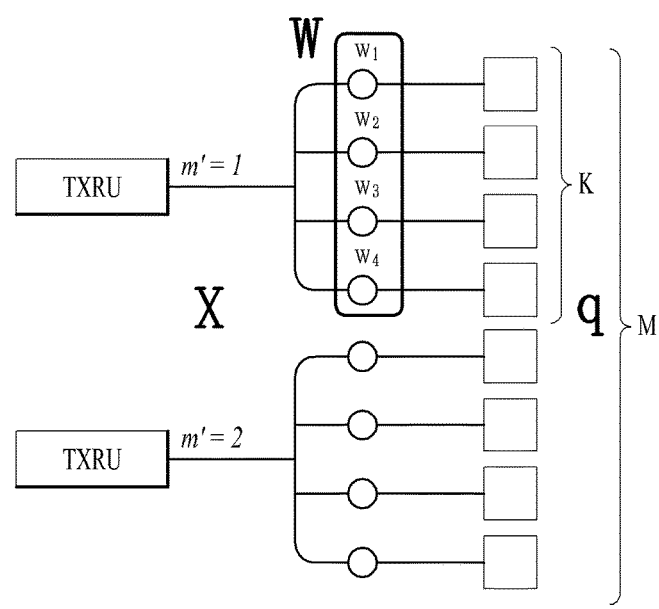
FIGS. 7 and 8 are diagrams illustrating representative methods for connecting TXRUs to antenna elements.
Figure 8:
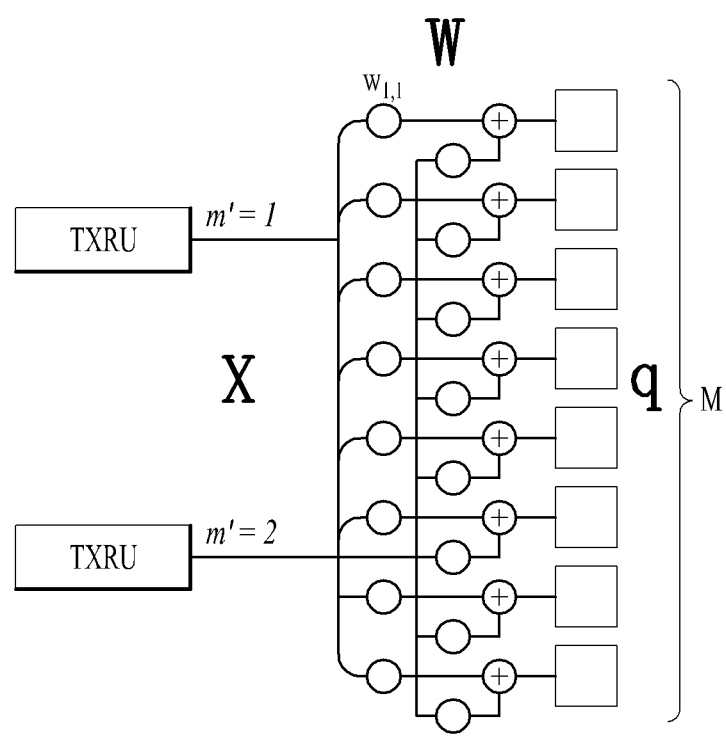

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas is used in an NR system to which the present invention is applicable, a hybrid beamforming technique combining digital beamforming and analog beamforming may be employed. Herein, analog beamforming (or Radio Frequency (RF) beamforming) refers to an operation of precoding (or combining) at the RF stage. In hybrid beamforming, the baseband stage and the RF stage perform precoding (or combining), respectively. Therefore, the number of RF chains and the number of digital-to-analog (D/A) (or analog-to-digital (A/D)) converters may be reduced, while achieving performance close to digital beamforming.

For simplicity of explanation, the hybrid beamforming structure may be represented by N transceiver units (TXRUs) and M physical antennas. In this case, digital beamforming for L data layers to be transmitted by the transmission end may be represented by an N*(N by L) matrix. The N converted digital signals obtained thereafter may be converted into analog signals via the TXRUs, and analog beamforming represented by an M*N (M by N) matrix is applied to the converted signals.

Figure 9:
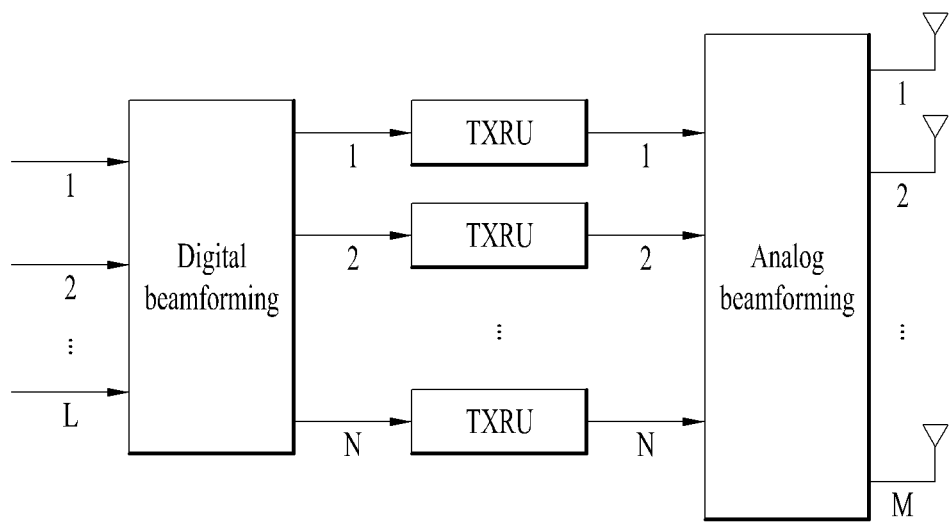
FIG. 9 is a diagram schematically illustrating a hybrid beamforming structure from the perspective of a TXRU and a physical antenna according to an embodiment of the present invention.

FIG. 9 is a diagram schematically illustrating a hybrid beamforming structure from the perspective of a TXRU and a physical antenna according to an embodiment of the present invention. In FIG. 9, the number of digital beams is L, and the number of analog beams is N.

Additionally, in the NR system to which the present invention is applicable, a method for supporting more efficient beamforming for a UE located in a specific area by designing the base station so as to change the analog beamforming on a symbol-by-symbol basis is being considered. Further, as shown in FIG. 9, when N specific TXRUs and M RF antennas are defined as one antenna panel, a plurality of antenna panels to which independent hybrid beamforming is applicable may be employed in the NR system according to the present invention.

When the base station utilizes a plurality of analog beams as described above, analog beams advantageous for signal reception may differ from UE to UE. Accordingly, in the NR system to which the present invention is applicable, a beam sweeping operation in which the base station transmits signals (at least a synchronization signal, system information, paging, and the like) by applying different analog beams on respective symbols in a specific subframe (SF) to allow all UEs to have a reception opportunity is being considered.

Figure 10:
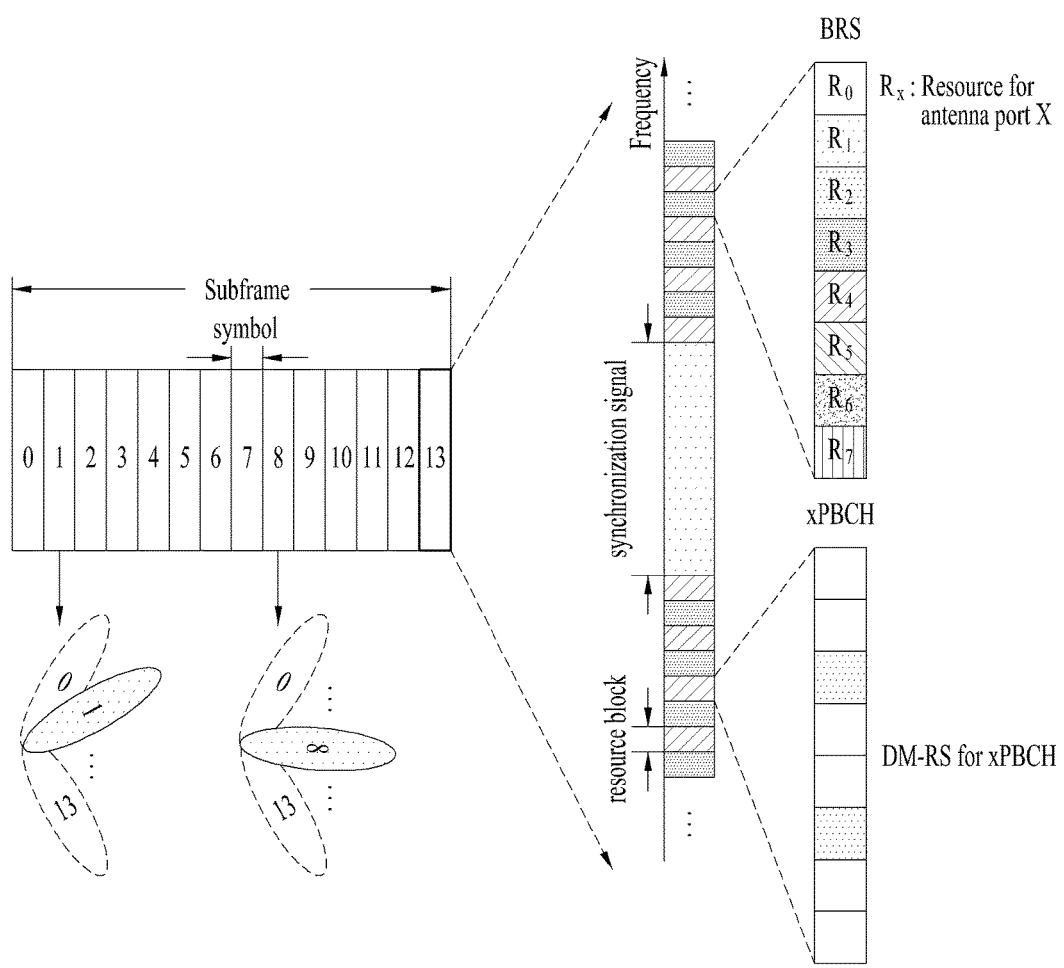
FIG. 10 is a diagram schematically illustrating a beam sweeping operation for a synchronization signal and system information in a downlink (DL) transmission process according to an embodiment of the present invention.

FIG. 10 is a diagram schematically illustrating a beam sweeping operation for a synchronization signal and system information in a downlink (DL) transmission process according to an embodiment of the present invention.

In FIG. 10, a physical resource (or a physical channel) on which system information of the NR system to which to the present invention is applicable is transmitted in a broadcasting manner is referred to as an xPBCH (physical broadcast channel). Here, analog beams belonging to different antenna panels within one symbol may be simultaneously transmitted.

In addition, as shown in FIG. 10, in the NR system to which the present invention is applicable, introduction of a beam reference signal (BRS), which is a reference signal (RS) transmitted by applying a single analog beam (corresponding to a specific antenna panel), is being discussed as an element for measuring a channel for each analog beam. The BRS may be defined for a plurality of antenna ports, and each antenna port of the BRS may correspond to a single analog beam. At this time, unlike the BRS, the synchronization signal or the xPBCH may be transmitted by applying all the analog beams in an analog beam group such it is well received by any UE.

3. Proposed Embodiments

Hereinafter, a method for transmitting and receiving an uplink control channel according to the present invention will be described in detail based on the technical elements described above.

First, for simplicity of explanation, the physical uplink control channel (PUCCH) structure applicable to the present invention may be broadly divided into three types:
(1) One-symbol PUCCH;
(2) Multi-symbol PUCCH (e.g., PUCCH transmitted over two or more symbols);
(3) A variant of the PUCCH of the LTE system.

Figure 6:
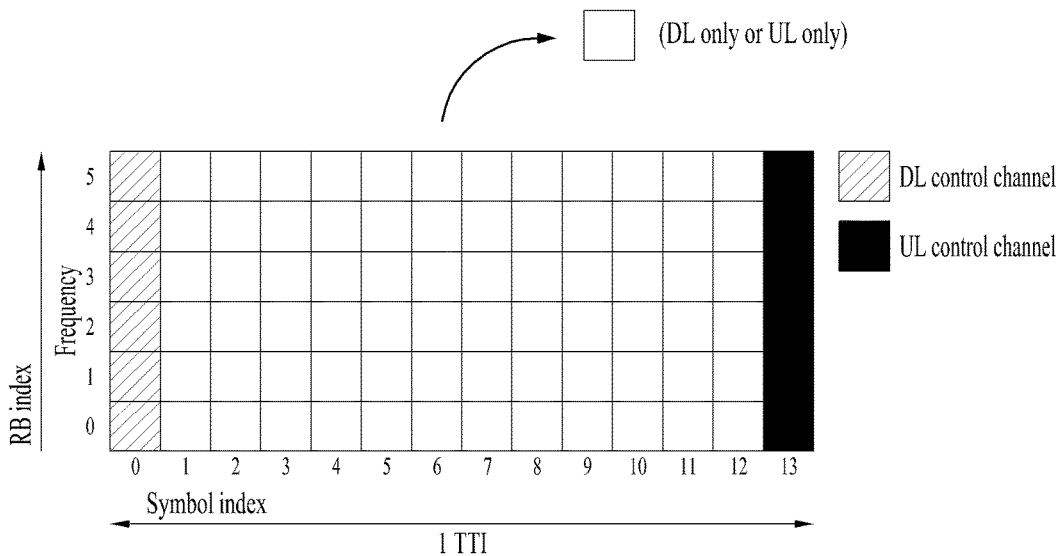
FIG. 6 is a diagram illustrating a self-contained subframe structure applicable to the present invention.

If most of the symbols are configured for downlink (DL) as in the subframe or slot structure shown in FIG. 6, one-symbol PUCCH may be transmitted in the last (or specific) symbol of the subframe or slot structure.

However, considering the UEs positioned at the cell boundary (or edge), the PUCCH transmitted only in one symbol may not ensure stable PUCCH transmission for the UEs positioned at the cell boundary due to insufficient energy (or transmission power). In view of this, a multi-symbol PUCCH, which is a PUCCH transmitted in a time region larger than that of one symbol PUCCH, may be used.

In this case, a plurality of symbols through which the multi-symbol PUCCH is transmitted may be composed of some symbols of a specific subframe or a specific slot or all symbols included in a subframe or a slot. Alternatively, the plurality of symbols through which the multi-symbol PUCCH is transmitted may be composed of a plurality of symbols of a plurality of subframes or slots.

In addition, when the PUCCH is transmitted over several symbols as described above, the PUCCH structure of the LTE system may be reused to the maximum degree. In this case, a UL region may be configured in various sizes in one subframe or slot. Therefore, a PUCCH structure applicable to the NR system according to the present invention may be designed to be varied acceding to the number of symbols of the time region in which the PUCCH of the LTE system is transmitted.

Hereinafter, the features of the PUCCH structure proposed in the present invention will be described in detail.

3.1. One-Symbol PUCCH

FIG. 11 is a diagram illustrating a one-symbol PUCCH structure according to an exemplary embodiment of the present invention. More specifically, FIG. 11(a) shows a structure in which a reference signal (RS) and uplink control information (UCI) transmitted on a one-symbol PUCCH are subjected to frequency division multiplexing (FDM). FIG. 11(b) shows a structure in which the RS and the UCI transmitted on the one-symbol PUCCH are subjected to time division multiplexing (TDM).

First, as shown in FIG. 11(a), subcarriers or subcarrier groups through which the RS and the UCI are transmitted may be subjected to FDM. Here, the UCI may include HARQ-ACK and/or channel state information (CSI) and/or scheduling request (SR) and/or beam-related information.

Alternatively, as shown in FIG. 11(b), a symbol through which RS and UCI are transmitted may be composed of a plurality of sub-symbols as the subcarrier spacing for the symbol is increased. In this case, some sub-symbol(s) in which the RS is transmitted among the plurality of sub-symbols may be subjected to TDM together with the remaining sub-symbol(s) in which the UCI is transmitted.

In a preferred example, as a method for further ensuring a decoding time for UCI transmission of the UE, the UE may transmit the RS in sub-symbol(s) preceding the UCI in the time domain.

In FIG. 11, it is assumed that a group of consecutive subcarriers (or a group of subcarriers spaced apart at regular intervals in the case of a comb structure) is defined as a UL resource element group (REG).

In this case, according to FIG. 11(a), the RS may be transmitted through some subcarrier(s) in a UL REG and the UCI may be transmitted through the other subcarrier(s) in the UL REG. Alternatively, each UL REG may include only subcarriers for transmitting the RS or the UCI.

According to FIG. 11(b), the RS may be transmitted through all subcarriers of some sub-symbol(s) in a UL REG and the UCI may be transmitted on all sub-carriers of the other sub-symbol(s).

The plurality of UL REGs may constitute one control channel element (UL CCE). Therefore, in the case of the one-symbol PUCCH, all UL REGs constituting a UL CCE may be present in the same symbol. For simplicity, a structure in which the UL REGs constituting the UL CCE are composed of consecutive frequency resources is referred to as a localized structure, and a structure in which the UL REGs constituting the UL CCE are composed of non-consecutive frequency resources is referred to as a distributed structure.

In the example described above, the RS may be generated or transmitted on the basis of a Zadoff-Chu sequence, or may be generated or transmitted on the basis of a pseudo random sequence. For example, when the UE transmits the PUCCH as shown in FIG. 11(b), a gain may be obtained in terms of reduction in Peak to Average Power Ratio (PAPR) if the RS is transmitted on the basis of the Zadoff-Chu sequence.

In addition, the UE may transmit UCI configured in a different format according to a UCI payload size to be transmitted.

For example, if the UCI payload size is less than or equal to K bits (e.g., K=2), the UE may transmit UCI generated based on a sequence (e.g., the Zadoff-Chu sequence or the pseudo random sequence) using the one-symbol PUCCH structure described above or another one-symbol PUCCH structure. Here, the other one-symbol PUCCH structure may include a PUCCH structure for transmitting sequence-based UCI without an RS.

In another example, if the UCI payload size exceeds K bits, the UE may transmit the UCI by performing OFDM (Orthogonal Frequency Division Multiplexing) or DFTS-OFDM (Discrete Fourier Transform-spread-OFDM) conversion on coded bits. Transmission may be performed using the one-symbol PUCCH structure described above or another one-symbol PUCCH structure. Here, whether the UE applies the OFDM conversion scheme or the DFTS-OFDM conversion scheme may be configured through a separate configuration method, which will be described later (section 4.1).

3.2. Multi-Symbol PUCCH

Figure 12:
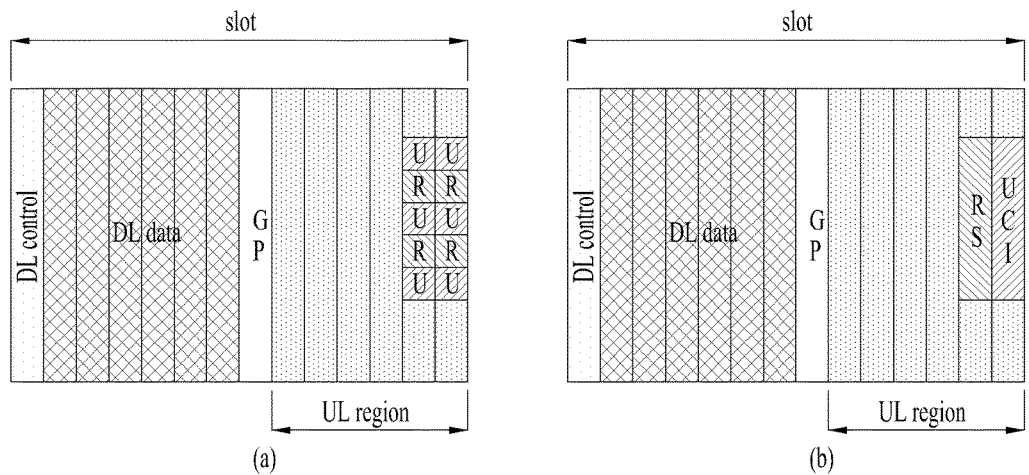
FIG. 12 is a diagram illustrating a multi-symbol PUCCH structure according to an exemplary embodiment of the present invention.

FIG. 12 is a diagram illustrating a multi-symbol PUCCH structure according to an exemplary embodiment of the present invention.

More specifically, the multi-symbol PUCCH structure applicable to the present invention may be designed by extending the one-symbol PUCCH structure described above. For simplicity of explanation, FIG. 12 shows a case where the multi-symbol PUCCH structure applicable to the present invention is a 2-symbol PUCCH structure.

For example, FIG. 12(a) shows a case where a PUCCH structure in which RS and UCI are subjected to FDM in each symbol is repeated in the time domain. FIG. 12(b) shows a structure in which RS and UCI are subjected to TDM.

The UE may use the transmission method described above to transmit the RS and the UCI of FIG. 12.

More specifically, the UE may generate and transmit the RS based on the Zadoff-Chu sequence or the pseudo random sequence. In particular, when the UE transmits the RS and the UCI in the PUCCH structure as shown in FIG. 12(b), the RS transmitted based on the Zadoff-Chu sequence may reduce PAPR.

In addition, if the UCI payload size is less than or equal to K bits (e.g., K=2), the UE may transmit the UCI generated based on a sequence (e.g., the Zadoff-Chu sequence or the pseudo random sequence) using the 2-symbol PUCCH structure described above or another 2-symbol PUCCH structure.

Alternatively, if the UCI payload size exceeds K bits, the UE may transmit the UCI by performing OFDM (Orthogonal Frequency Division Multiplexing) or DFTS-OFDM (Discrete Fourier Transform-spread-OFDM) conversion on coded bits. Transmission may be performed using the 2-symbol PUCCH structure described above or another 2-symbol PUCCH structure. Here, whether the UE applies the OFDM conversion scheme or the DFTS-OFDM conversion scheme may be configured through a separate configuration method, which will be described later (section 4.1).

In addition, the multi-symbol PUCCH structure may have a PUCCH structure of four or more symbols.

In this case, the 2-symbol PUCCH structure shown in FIG. 12(a) may be extended. In this case, a multi-symbol PUCCH structure (e.g., a 4-symbol PUCCH structure) according to the present invention may have a structure formed by repeating the 2-symbol PUCCH structure described above in the time domain.

Figure 13:
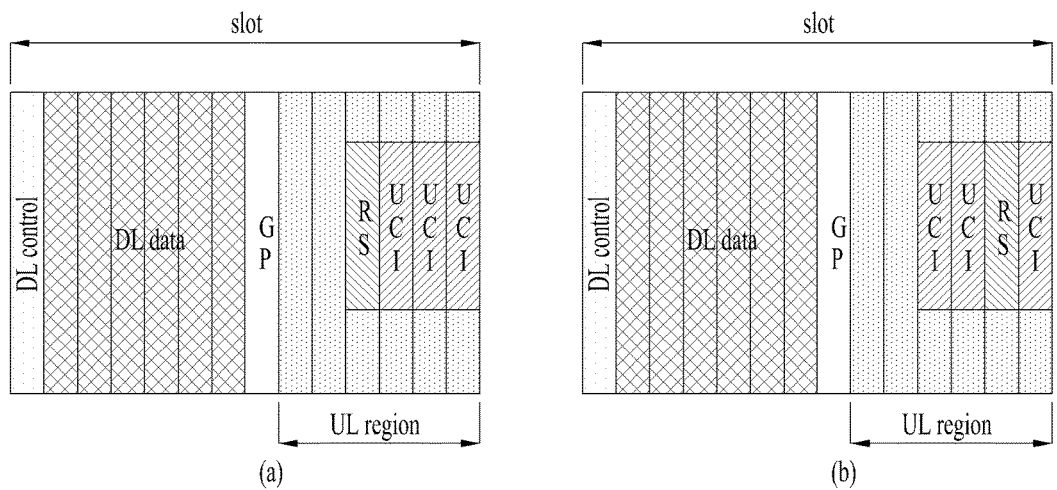
FIG. 13 is a diagram illustrating a multi-symbol PUCCH structure according to another exemplary embodiment of the present invention.

In addition, a multi-symbol PUCCH structure (e.g., a 4-symbol PUCCH structure) according to the present invention may be extended as shown in FIG. 13.

FIG. 13 is a diagram illustrating a multi-symbol PUCCH structure according to another exemplary embodiment of the present invention.

As shown in FIG. 13, in the case of a multi-symbol PUCCH structure in which RS and UCI are transmitted through TDM, the multi-symbol PUCCH structure according to the present invention may be configured like the PUCCH structure of FIG. 13(a), in which the RS is transmitted only in the first symbol, or may be configured like the PUCCH structure of FIG. 13(b), in which the RS is transmitted in a specific symbol (e.g., the third symbol among the symbols in which the PUCCH is transmitted or the second to last symbol in the time domain, etc.).

When the UE transmits an RS and UCI according to the PUCCH structure as shown in FIG. 13(a), the UE may transmit HARQ-ACK information ahead of other information in the time domain in order to maximize the early decoding gain due to the previously transmitted RS (front-loaded RS).

For example, if the UCI includes both HARQ-ACK information and CSI information (and beam-related information), the UE may perform separate coding on each of the HARQ-ACK and the CSI information, and then transmits the UCI by mapping the HARQ-ACK coding bits to symbols starting with a symbol preceding in the time domain. This method is advantageous in that reliability of the HARQ-ACK information may be increased by arranging the HARQ-ACK information, which has relatively high importance, near the RS.

As a variation of the example above, as shown in FIG. 13(b), even if the RS symbol is not transmitted ahead of other UCI, the UE may perform separate coding on the HARQ-ACK and the CSI, and then map the HARQ-ACK information on a symbol adjacent to the RS symbol (and preferentially to a preceding symbol in the time domain) to transmit the HARQ-ACK information.

In the case of a long-interval PUCCH with 4 or more symbols to which frequency hopping is applied, the mapping/transmission method described above may be applied to each hop.

Alternatively, the UE may perform separate coding on the HARQ-ACK and the CSI, and then map only the HARQ- ACK information to the preceding hop of the two hops (or to some preceding symbols regardless of frequency hopping) and only the CSI information to the following hop (or some following symbols regardless of frequency hopping) to transmit the HARQ-ACK and the CSI.

In this case, there may be a difference in RS density between the hops (or symbols) on which HARQ-ACK information is carried (or transmitted) and the hop (or symbols) on which only CSI information is carried. In particular, more RS symbols may be included in the hop (or symbols) on which HARQ-ACK information is carried (or transmitted). In the example described above, only the correlation between the hops (or symbols) on which the HARQ-ACK information and the CSI information are carried (or transmitted) has described. However, in the PUCCH configured with various kinds of UCI information, UCI information having a higher priority (e.g., SR, HARQ-ACK or aperiodic CSI) may correspond to the HARQ-ACK of the method described above and UCI information having lower priority (e.g., periodic CSI) may correspond to the CSI of the method described above.

In the case of the transmission method illustrated in FIG. 13(b), multiplexing may be performed with PUCCHs having different lengths as shown in FIG. 12(b).

In this case, the position of the RS symbol may be fixed only to the second to last symbol among the symbols constituting a specific subframe or slot. Alternatively, the position of the RS symbol may be set to the second to last symbol (and additionally symbols spaced at predetermined intervals based on the symbol above) among the symbols in which the PUCCH is actually transmitted.

For example, it is assumed that an RS is configured to be additionally transmitted every two symbols. In case, the RS may be transmitted in symbols 10/12 within a PUCCH which is transmitted in symbols 10/11/12/13. Alternatively, the RS may be transmitted in symbols 10/12 within a PUCCH transmitted in symbols 9/10/11/12/13. Alternatively, the RS may be transmitted in symbols 8/10/12 within a PUCCH transmitted in symbols 8/9/10/11/12/13.

Additionally, as a more flexible method, symbols in which the UE transmits the RS among several symbols constituting the PUCCH may be configured by L1 signaling (e.g., PHY) or higher layer signaling (e.g., RRC).

When the RS and the UCI subjected to FDM are transmitted over several symbols as shown in FIG. 12(a), or the UCI is transmitted over several symbols as shown in FIG. 13, the UCIs transmitted in each symbol may be the same or different.

Specifically, if the information is the same among the symbols, an orthogonal cover code (OCC) may be applied to allow (support) multiplexing between UEs. For example, when UE1 and UE2 transmit the PUCCH as shown in FIG. 12(a), the UCI (and/or RS) transmitted by UE1 in the last symbol may be the same as the UCI (and/or RS) transmitted by UE1 in the second to last symbol, and the UCI (and/or RS) transmitted by UE2 in the last symbol may be the same as the UCI (and/or RS) transmitted by UE2 in the second to last symbol. In this case, if a 2-length OCC (e.g., [1,1] and [1, −1]) is applied to each UCI (and/or RS) of each UE in every symbol, the PUCCHs of UE1 and UE2 may be subjected to CDM in the same frequency region and transmitted.

When UE1 and UE2 transmit a PUCCH as shown in FIG. 13(a), the UCIs transmitted by UE1 in the last symbol, the second to last symbol, and the third to last symbol may be the same, and the UCIs transmitted by UE2 in the last symbol, the second to last symbol and the third to last symbol may be the same. In this case, if a length 3 OCC is applied to each UCI of each UE in every symbol, the PUCCHs of UE1 and UE2 (up to 3 UEs) may be subjected to CDM in the same frequency region and transmitted. At this time, orthogonality between the UEs may be satisfied by differently applying the values of the base sequence and/or the cyclic shift to the RSs transmitted by the respective UEs.

When CDM between PUCCHs each having a different number of symbols constituting the PUCCH is considered, an OCC having a length smaller than the number of UCI symbols in the PUCCH may be applied to each UE. For example, in the case where UE1 transmits an RS in symbol #12 and transmits UCI in symbols #10/#11/#13/#14, UE1 may apply a 2-length OCC to symbol #13/#14 to transmit the same UCI. In this case, if UE2 transmits an RS in symbol #12 and transmits, in symbols #13/#14, UCI to which the length 2 OCC has been applied, CDM between a 5-symbol PUCCH and a 3-symbol PUCCH of each UE may be supported.

When RS and UCI are subjected to TDM as shown in FIG. 12(b), a frequency region used by one PUCCH should be the same between symbols. However, if RS and UCI are included in one UL REG as shown in FIG. 12(a), inter-symbol frequency hopping may be applied (or allowed) and thus a frequency diversity gain may be required.

In one example, frequency hopping may be configured not to be allowed for a PUCCH having the distributed structure at any time. That is, if the PUCCH has the distributed structure, the UE may be configured to transmit the PUCCH through the same frequency resource region in several symbols. This is because the distributed structure guarantees frequency diversity gain. In other words, the UE and the gNB may acquire a frequency diversity gain by utilizing the PUCCH of the distributed structure.

On the other hand, for a PUCCH having the localized structure, whether to apply frequency hopping may be configured (by L1 signaling or higher layer signaling).

In this case, whether to apply frequency hopping may be configured for each UE since the UEs may use different frequency-region resources between symbols and thus have different power transient periods.

Alternatively, whether to apply frequency hopping may be configured according to the symbol length of the PUCCH. For example, frequency hopping may be allowed only when the symbol length of the PUCCH is greater than or equal to X symbols.

For reference, in the case where the structure shown in FIG. 12(a) is extended to 4 symbols, if the UE applies frequency hopping in units of two symbols (when the localized structure is given) to transmit PUCCH, from degradation may occur due to the power transient period. However, this may not have a great influence on PUCCH reception by the gNB.

As shown in FIG. 12(b), frequency hopping may be applied (or allowed) to obtain a frequency diversity gain even when RS and UCI are subjected to TDM. However, there may be a restriction that an RS symbol must be present in each hop for decoding. In this case, whether to perform frequency hopping may be configured according to the symbol length of the PUCCH in consideration of the power transient period.

Figure 14:
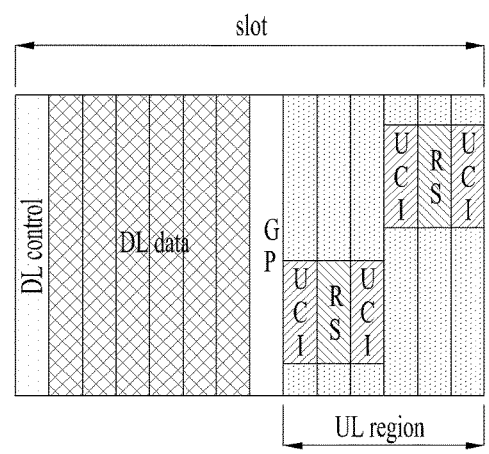
FIG. 14 is a diagram illustrating a multi-symbol PUCCH structure according to another exemplary embodiment of the present invention.

FIG. 14 is a diagram illustrating a multi-symbol PUCCH structure according to another exemplary embodiment of the present invention.

As shown in FIG. 14, according to the present invention, frequency hopping may be applied (or configured) only when more than three symbols are secured as a PUCCH region which uses the same frequency resource. This is because presence of UCI symbols in at least both symbols adjacent to the RS symbol may minimize the influence of the power transient period on the RS.

In performing frequency hopping in a slot for a multi-symbol PUCCH according to the present invention, a method for configuring a number of a hopping unit (a resource unit composed of consecutive symbols transmitted in the same frequency resource) according to the number of symbols constituting the PUCCH may be pre-configured as follows.

For example, if the number of symbols constituting the PUCCH is K, each hopping unit may be composed of ceiling {K/2} symbols and K-ceiling {K/2} symbols. Here, ceiling {a} may mean the smallest integer among integers greater than or equal to a.

In another example, the hopping units may be defined with respect to the center of the slot. As a specific example, in the case of a PUCCH composed of symbols #4 to #14 (11 symbols) in a slot composed of 14 symbols, the hopping units may be composed of symbols #4 to #7 and symbols #8 to #14, respectively.

In another example, a symbol index for distinguishing a hopping unit may be defined in advance. As a specific example, if a specific symbol index is defined as 9 in a slot composed of 14 symbols, the hopping units may be composed of symbols #4 to #8 and symbols #9 to #14, respectively.

Alternatively, the method of configuring hopping units may be configured according to the number of RS symbols constituting the PUCCH. In one example, if there is one RS symbol, frequency hopping may not be performed. In another example, if there are two RS symbols, two hopping units may be configured and each of the hopping units may include one RS symbol. In another example, if there are three RS symbols, two hopping units may be configured. In this case, one hopping unit may include one RS symbol, and the other hopping unit may include two RS symbols. Alternatively, three hopping units may be configured, and each of the hopping units may include one RS symbol.

Additionally, a specific hopping unit may include no RS symbol. If no RS symbol is included in the specific hopping unit, the specific hopping unit may be restricted so as to be transmitted in the RB region that is the same as (or includes) the other hopping unit including an RS symbol. In other words, the RS may be configured to be transmitted in at least one symbol of the consecutive/non-consecutive symbols occupying the same frequency region. The RS symbol may be configured to be mapped to the most preceding symbol in the time domain.

The frequency hopping method as described above may be applied even to the PUSCH in the same way. In this case, additional DM-RS transmission may be triggered when frequency hopping is configured or instructed. Alternatively, the UE may expect frequency hopping to be performed only when additional DM-RS transmission is configured or instructed.

Additional DM-RS transmission other than the front-loaded DM-RS may be configured not only for frequency hopping but for reasons such as characteristics of a high frequency band or high mobility.

As such, the position of the additional DM-RS for other uses may vary depending on the uses thereof. Specifically, the position of a DM-RS added for frequency hopping may be behind the position of a DM-RS added for a reason of high mobility or the like in time (considering the power transient period in hopping). For example, the position of a DM-RS added for a reason of high mobility or the like may be set to a center symbol of a slot (e.g., the eighth symbol in a slot composed of 14 symbols), and the position of the DM-RS added for the purpose of frequency hopping may be set to a symbol corresponding to the existing front-load DM-RS symbol index+7.

In the NR system to which the present invention is applicable, various types of data (e.g., enhanced Mobile Broadband (eMBB) data, Ultra Reliable Low Latency Communications (URLLC) data, etc.) having service requirements may be supported for the same UE. In this case, numerologies (e.g., subcarrier spacings) of the eMBB data and the URLLC data may differ from each other in order to satisfy different service requirements. Further, different types of data may be multiplexed in the same slot.

Figure 15:
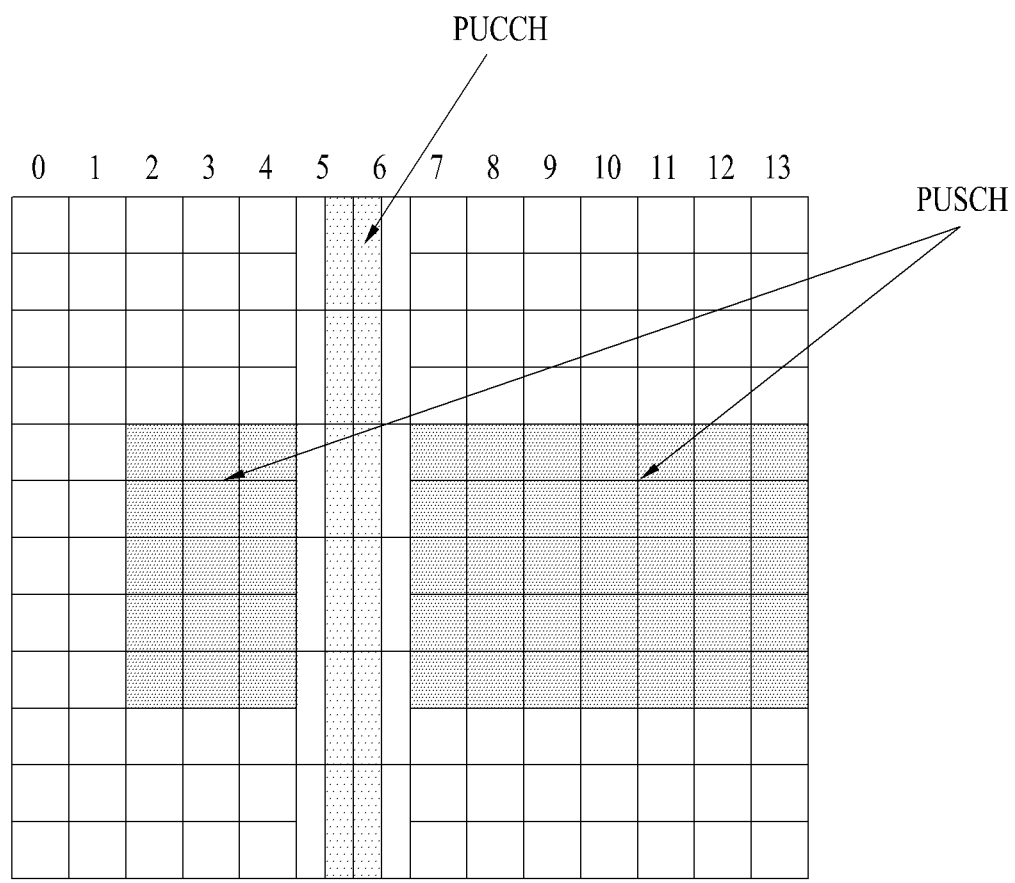
FIG. 15 is a diagram schematically illustrating a configuration for transmitting a PUCCH and a PUSCH according to an exemplary embodiment of the present invention.

FIG. 15 is a diagram schematically illustrating a configuration for transmitting a PUCCH and a PUSCH according to an exemplary embodiment of the present invention.

As shown in FIG. 15, the UE may transmit a PUCCH (or PUSCH) based on the 30 kHz subcarrier spacing in the middle of transmitting a PUSCH (or PUCCH) based on the 15 kHz subcarrier spacing. In this case, as a method for addressing performance deterioration caused by the power transient period, the UE may transmit the PUCCH (or PUSCH), leaving some sub-symbols blank. Here, a power mask may be configured such that the blank sub-symbol region is included in the power transient period.

Alternatively, in FIG. 15, the UE may transmit the PUCCH in both sub-symbols in symbol #6 and utilize symbol #7 (or a portion thereof) as the power transient period.

The method above may be applied not only when the same UE transmits different channels simultaneously in the same slot but also when the same UE transmits the same channel having different numerologies in the same slot.

The RS and/or UCI constituting the one-symbol PUCCH and/or the multi-symbol PUCCH described above may be multiplexed using one or more of the following methods.

(1) FDM Structure

As shown in FIG. 11(a), the RS and the UCI may be transmitted by performing FDM on a transmission subcarrier (or a group of subcarriers) between the RS and the UCI. For example, when a subcarrier spacing is increased to divide a symbol region into a plurality of sub-symbols for PUCCH transmission, the UE may transmit a PUCCH of an FDM structure in some sub-symbol(s) of the sub-symbols.

(2) TDM Structure

As shown in FIG. 12(b), the RS and the UCI may be subjected to TDM and transmitted. For example, when a subcarrier spacing is increased to divide a symbol region into a plurality of sub-symbols for PUCCH transmission as shown in FIG. 11(b), the UE may transmit the RS in some sub-symbol(s) of the sub-symbols and transmit the UCI in the remaining sub-symbol(s).

(3) FDM+TDM Structure

Figure 16:
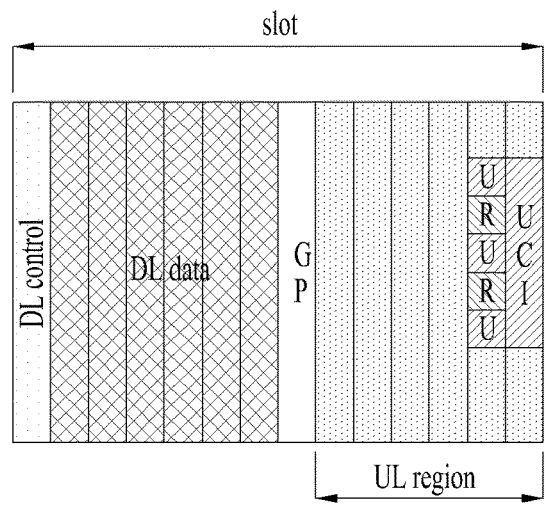
FIG. 16 is a diagram illustrating a multi-symbol PUCCH structure according to another exemplary embodiment of the present invention.

FIG. 16 is a diagram illustrating a multi-symbol PUCCH structure according to another exemplary embodiment of the present invention.

As shown in FIG. 16, the RS and the UCI may be transmitted by performing TDM and FDM thereon. For example, when a subcarrier spacing is increased to divide a symbol region into a plurality of sub-symbols for PUCCH transmission, the UE may transmit the RS and the UCI in the FDM+TDM structure through some sub-symbol(s) of the sub-symbols.

(4) Code Division Multiplexing (CDM) Structure

The RS and the UCI may be transmitted by performing CDM thereon in the same resource region. For example, when a subcarrier spacing is increased to divide one symbol region into a plurality of sub-symbols for PUCCH transmission, the UE may transmit a PUCCH (RS and UCI) in the CDM structure (e.g., a subcarrier spacing) through some sub-symbol(s) of the sub-symbols.

(5) RS-Less Structure

A PUCCH structure (e.g., a structure similar to on/off keying (OOK)) in which a sequence corresponding to UCI is pre-configured and a UE transmits only the corresponding sequence may be considered. In this structure, the gNB may receive the PUCCH through non-coherent detection.

At this time, the UE may receive, from the gNB, an indication of an RS/UCI multiplexing structure on which PUCCH transmission is to be based among the various structures described above (and other unlisted structures).

In one example, a structure that a PUCCH to be transmitted conforms to may be indicated for each slot (or group of slots) to the UE using dynamic signaling such as DCI. In this case, a set of structures selectable through dynamic signaling may be pre-configured for each UE through higher layer signaling, and one PUCCH structure for the UE to apply in PUCCH transmission in the set configured by higher layer signaling may be indicated by dynamic signaling.

In another example, a structure that a PUCCH to be transmitted conforms to may be semi-statically indicated for each slot (or group of slots) to the UE by L1 signaling or higher layer signaling.

In another example, a structure that a PUCCH to be transmitted conforms to may be indicated for each slot (or group of slots) to the UE in an implicit manner. Here, the implicit manner means that a structure that a PUCCH to be transmitted conforms to may be implicitly configured according to specific parameters (e.g., DCI transmission control resource index, DL data transmission resource (e.g., RB) index, the amount of DL data transmission resources (e.g., the number of symbols or REs), TBS (Transmission Block Size) or MCS (Modulation and Coding Scheme) of DL data, DL HARQ process ID, coverage of the UE, UCI payload size, UCI type (e.g., HARQ-ACK, rank indicator, scheduling request, beam related information)).

In addition, when a structure for multiplexing the RS and/or the UCI constituting the one-symbol PUCCH and/or the multi-symbol PUCCH described above is transmitted in a plurality of symbols or in multiple REGs (in the frequency domain), the transmission method for the UCI may depend on the UCI payload size.

For example, when a UCI is transmitted in a plurality of symbols (or a plurality of REGs or CCEs in the frequency domain) according to the FDM structure or the CDM structure, the same UCI or different UCIs may be transmitted in each symbol (or each REG or CCE in the frequency domain) depending on the UCI payload size. As a specific example, if an FDM structure PUCCH consisting of several symbols is configured and the maximum UCI payload size transmittable per symbol (or per REG or CCE in the frequency domain) is K coding bits (e.g., K=2), the UE may configure the same UCI for each symbol (or for each REG or CCE in the frequency domain) in order to transmit a UCI payload configured to have a size less than or equal to K coding bits. At this time, a time-domain OCC (or a frequency-domain OCC) may be applied in consideration of multiplexing between UEs. Here, application of an OCC may be configured by higher layer signaling or L1 signaling.

Subsequently, the UE may transmit different UCI coding bits for each symbol to transmit a UCI payload having a size exceeding K coding bits.

In another example, when a UCI is transmitted in a plurality of symbols (or REGs in the frequency domain) according to the TDM structure, the same UCI or different UCIs may be transmitted in each symbol (or each REG or CCE in the frequency domain) depending on the UCI payload size. As a specific example, if a TDM structure PUCCH consisting of several symbols (in particular, a UCI part consisting of several symbols) is configured (considering a resource within one symbol (or a frequency resource configured in one REG or CCE) and the maximum UCI payload size transmittable per symbol (or per REG or CCE in the frequency domain) is K coding bits (considering resources in one symbol (or frequency resources configured in one REG or CCE)), the UE may configure the same UCI for each symbol (or for each REG or CCE in the frequency domain) in order to transmit a UCI payload configured to have a size less than or equal to K coding bits. At this time, a time-domain OCC (or a frequency-domain OCC) may be applied in consideration of multiplexing between UEs. Here, application of an OCC may be configured by higher layer signaling or L1 signaling. Subsequently, the UE may transmit different UCI coding bits for each symbol to transmit a UCI payload having a size exceeding K coding bits.

In another example, whether a PUCCH is transmitted according to the FDM+TDM structure may be determined by the UCI payload size. For example, if PUCCH transmission over several symbols is configured for a specific UE according to the FDM structure, the specific UE may fill some symbol(s) of the symbols configured according to a predefined (or signaled) rule with only UCI (coding bits) without the RS in order to transmit a UCI payload having a size exceeding a certain bit size (e.g., P coding bits). Alternatively, if PUCCH transmission over several symbols is configured for a specific UE according to the TDM structure, the specific UE may transmit not only the RS but also the UCI in some (or all) symbols of the symbols configured to transmit only the RS according to a predefined (or signaled) rule, in order to transmit a UCI payload exceeding a certain bit size (e.g., P coding bits).

In the methods for multiplexing the RS and/or UCI constituting the one-symbol PUCCH and/or the multi-symbol PUCCH described above, the RS symbols of the TDM structure may be shared among the PUCCH resources, but the UCI symbols may be configured so as to differ from one PUCCH resource to another.

Figure 17:
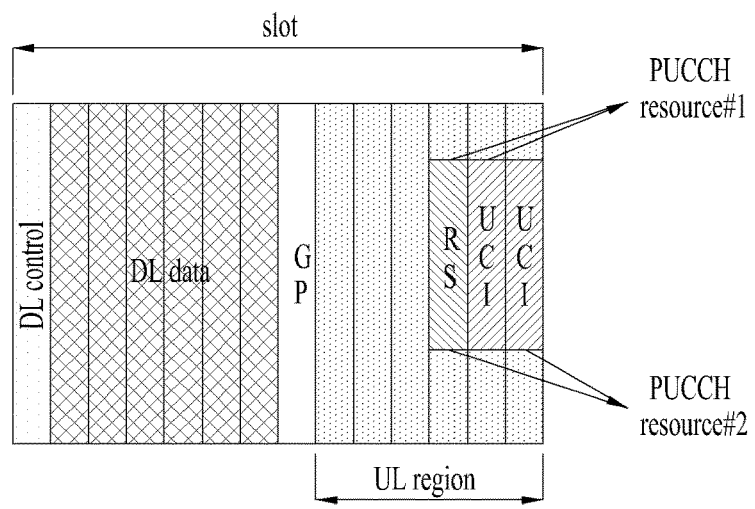
FIG. 17 is a diagram illustrating a multi-symbol PUCCH structure according to another exemplary embodiment of the present invention.

FIG. 17 is a diagram illustrating a multi-symbol PUCCH structure according to another exemplary embodiment of the present invention.

For example, as shown in FIG. 17, PUCCH resource #1 may be composed of symbol #11 (RS only symbol) and symbol #12 (UCI only symbol), and PUCCH resource #2 may be composed of symbol #11 (RS only symbol) and symbol #13 (UCI only symbol). If the RS regions of the different PUCCH resources are the same, quasi-orthogonal sequences may be configured to be applied to the RSs for each PUCCH resource, or comb transmission (e.g., PUCCH resource #1 is assigned odd REs, PUCCH resource #2 is assigned even REs) may be configured for the RSs. Sharing an RS symbol region between different PUCCH resources as described above may reduce the resource region through which the RSs are transmitted.

In another example, PUCCH resource #1 may be composed of symbols #11 (UCI only symbol) and symbol #12 (RS only symbol), and PUCCH resource #2 may be composed of symbols #12 (RS only symbol) and symbols #13 (UCI only symbol). In this case, for symbol #12 (RS only symbol), which is a shared symbol, quasi-orthogonal sequences may be configured to be applied to the RSs of the respective PUCCH resources, or comb transmission (e.g., PUCCH resource #1 is assigned odd REs, and PUCCH resource #2 is assigned even REs) may be configured for the RSs.

The structure in which TDM is performed on the RS and the UCI by sharing an RS symbol region between the PUCCH resources as described above may be easily applied even to a structure in which one symbol region is divided into several sub-symbols (by increasing a subcarrier spacing).

Hereinafter, among the methods of multiplexing RSs and/or UCIs constituting the one-symbol PUCCH and/or the multi-symbol PUCCH described above, a method for multiplexing a symbol for transmitting only an RS of the TDM structure (RS only symbol) (or a symbol for transmitting only UCI (UCI only symbol)) and a sounding reference signal (SRS) symbol will be described in detail. As a method, multiplexing may be supported by configuring an RS for the PUCCH in the form of a comb (e.g., an even comb) and configuring the SRS in the form of another comb (e.g., an odd comb). In the same way, multiplexing may be supported by configuring UCI in the form of a comb (e.g., an even comb) and configuring the SRS in the form of another comb (e.g., an odd comb).

The method above may be generalized so as to be applied to the one-symbol PUCCH and/or the multi-symbol PUCCH described above. That is, some RSs on a symbol in which only RSs are configured may be blank, some UCIs on a symbol in which only UCIs are configured may be blank, or (some) RSs and/or (some) UCIs on a symbol in which RSs and/or UCIs are configured be blank (on behalf of SRS transmission). Thereby, a gain of multiplexing with the SRS may be obtained by transmitting the SRS in the blank REs, or a gain of multiplexing between PUCCH (which have the same length or different length in the time domain) may be obtained by transmitting the RS (or UCI) of another (UE) PUCCH in the blank REs.

For example, when a structure in which the RS/UCI are subjected to FDM is applied, the RS of the first symbol may be configured to be blank for a 2-symbol PUCCH (e.g., a first PUCCH), and the RS may be configured to be transmitted for the one-symbol PUCCH (e.g., a second PUCCH) at the position of the RS that is blank for the 2-symbol PUCCH. Thereby, the multiplexing capacity between PRSs may be enhanced.

As another example, in the case where the FDM+TDM structure is applied to the RS/UCI, the RS/UCI may be subjected to FDM on the first symbol and only the UCI may be configured to be transmitted on the second symbol for PUCCH #A, which is a 2-symbol PUCCH. For PUCCH #B, which is a 2-symbol PUCCH, only the UCI may be transmitted on the first symbol, and the RS/UCI may be configured to be subjected to FDM on the second symbol. And PUCCH #A and PUCCH #B may be transmitted on the same symbols. At this time, the two PUCCHs may be multiplexed by configuring some REs on the second symbol of PUCCH #A so as to be blank and configuring some REs on the first symbol of PUCCH #B so as to be blank.

In the FDM+TDM structure of the methods for multiplexing the RS and/or UCI constituting the one-symbol PUCCH and/or the multi-symbol PUCCH described above, the UCI transmission scheme may be defined differently for the RS/UCI symbol and the UCI only symbol. For example, in a symbol where the UCI and the RS are subjected to FDM, the UCI may be configured to transmit (quasi-)orthogonal sequences (e.g., ZE sequences having different rood indexes or cyclic shift values or pseudo random sequences having different seed values) for different information, and a time-domain OCC may be configured to be applied when a plurality of symbols is configured as the UCI-only symbol.

In the FDM structure of the methods for multiplexing the RS and/or UCI on a multi-symbol PUCCH (in particular, a 2-symbol PUCCH), the UCI may be transmitted in a manner that identical UCI is repeated in the two symbols (First option), or encoded bits may be transmitted by being distributed over two symbols (Second option). According to the first option, the time-domain OCC may not be applied to identical UCIs. Alternatively, the time-domain OCC may be applied to the RS even if different coded bits are distributed and transmitted as in the second option.

Specifically, multiplexing of RSs between UEs may be supported through (quasi-) orthogonal sequences (e.g., ZE sequences having different root indices or cyclic shift values or pseudo random sequences having different seed values) on each symbol and a time-domain OCC may be additionally applied (Third option), or multiplexing between UEs may be supported by a combination of a (quasi-)orthogonal sequence and a time-domain OCC (Fourth option). In this case, if orthogonal sequences are supported using the CS value, the CS spacing may be larger in the fourth option than in the third option, given the same multiplexing capacity.

In the first option, if the time-domain OCC is not applied between the identical UCIs, different interleaving and/or scrambling may be applied to the UCIs for the respective symbols.

In addition, in the methods for multiplexing the RS and/or UCI on a multi-symbol PUCCH (e.g., 2-symbol PUCCH), whether the RS is configured for both symbols as in the FDM structure or on one (e.g., the first or last symbol) of the two symbols as in the FDM+TDM structure may be determined as follows.

As an example, basically, it may be set whether the RS is to be configured for only one symbol or for both symbols (First RS configuration method).

As another example, the RS may be configured in both symbols (regardless of whether or not the time-domain OCC is used) if identical UCIs are transmitted as in the first option described above, or may be configured in only one of the symbols or configured as in the first RS configuration method if different coded bits are distributed as in the second option (Second RS configuration method).

As another example, the RS may be configured in both symbols if the time-domain OCC is applied in the first option, or may be configured in only one of the symbols if the time-domain OCC is not applied in the first option or different coded bits are distributed as in the second option (Third RS configuration method).

In the first to third RS configuration methods described above, if the RS is not configured in a specific symbol, the UCI may be configured to be transmitted or blank in the REs of the corresponding RS.

If one DCI triggers two 1-symbol PUCCH transmissions subjected to TDM, the RS may be configured in only one specific symbol (only when the frequency-domain resources of the two 1-symbol PUCCHs are the same or partially overlap) or configured as in the first RS configuration method. In the case where the RS is configured in only one specific symbol, a rule may be predefined such that the RS symbol is always configured only in the first symbol or the last symbol, or is configured only on the PUCCH including HARQ-ACK (or scheduling request or CSI) transmission.

In the FDM or FDM+TDM structure of the methods for multiplexing the RS and/or UCI constituting the one-symbol PUCCH and/or the multi-symbol PUCCH described above, RS/UCI mapping in a symbol in which FDM is performed on the RS and the UCI may depend on inter-cell interference.

Specifically, a method of hopping an RE pattern (or comb) occupied by an RS in each symbol between different symbols/slots/REGs/cells (e.g., even comb in sym1/slot1/REG1/cell1, odd comb in sym2/slot2/REG2/cell2, determining the RE pattern as a function of symbol/slot/REG/cell index) may be considered.

For example, in the case of a structure in which one RS is transmitted every N REs, the RE position of the RS for each cell may be determined according to a function of the cell index (e.g., mod (cell index, N)). Alternatively, if there are several (consecutive) REs allocated to RS transmission per N REs, the starting RE of the RS transmission (and/or the transmission REs of the RS) may be determined according to a function of the cell index (e.g., mod (cell index, N).

In addition, in the structures described above, the RS density in a symbol in which the RS and the UCI are transmitted through FDM may depend on the number of symbols in which the RS is transmitted (in the same RB region). Specifically, as the number of symbols in which the RS is transmitted (in the same RB region) increases, RS and UCI are FDM, and the RS density in a symbol in which the RS and the UCI are transmitted through FDM may be reduced.

Figure 18:
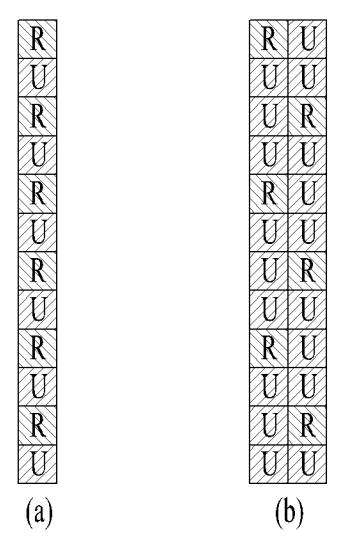

FIG. 18 is a diagram illustrating a structure in which RS and UCI are subjected to FDM or FDM+TDM according to an exemplary embodiment of the present invention.

For example, in a 1-symbol PUCCH (e.g., FIG. 18(a)) on which the RS/UCI are transmitted through FDM and a 2-symbol PUCCH (e.g., FIG. 18(b)) on which the RS/UCI are transmitted through FDM, the RS for each symbol may be composed of K (e.g., K=6) REs among 12 REs for the 1-symbol PUCCH and composed of K/2 REs among 12 REs for the 2-symbol PUCCH.

Accordingly, the RS overhead of the PUCCH transmitted through a plurality of symbols may be reduced. In addition, in order to improve channel estimation performance, the RE pattern may be changed from one symbol to another as described above.

Considering that the resource index of PUCCH format 1 is determined by a combination of PRB index, OCC, and cyclic shift in the legacy LTE system, one PUCCH resource index in the NR system to which the present invention is applicable may be determined at least by a combination of the following kinds of information (or a portion thereof).

In other words, the PUCCH resource index according to the present invention may be a resource index given when an implicit link is configured between the PDCCH and/or PDSCH and the PUCCH. Alternatively, if candidates of PUCCH resources are configured by higher layer signaling (or broadcast information or dynamic L1 signaling) in a similar manner to the ARI (ACK/NACK resource indicator) of the legacy LTE system, and the value of one of the candidates is set as a real PUCCH resource index, the PUCCH resource index according to the present invention may be a PUCCH resource index that may be set by higher layer signaling.

OCC, root index, cyclic shift, and/or scrambling seed for the RS/UCI

Here, in the case of a sequence for the RS/UCI, a ZC (Zadoff-Chu) or CAZAC (Constant Amplitude Zero Autocorrelation Waveform) sequence or a {PR (Psedo-Random) or Gold} sequence may be considered. For the {ZC or CAZAC} sequence, the PUCCH resource may be identified by the OCC/CS/root index. For the {PR or Gold} sequence, the PUCCH resource may be identified by the OCC/scrambling seed.

An RS pattern (e.g., comb) occupied by the RS in the RS symbol

Time/frequency-domain OCC code applied to the UCI

The number of symbol indexes and/or symbols constituting a PUCCH

A PUCCH structure for multiplexing the RS and/or UCI constituting the one-symbol PUCCH and/or the multi-symbol PUCCH described above 3.3. Variation of PUCCH of LTE System FIG. 19 is a diagram schematically illustrating the structure of PUCCH format 3 in an LTE system.

Figure 19:
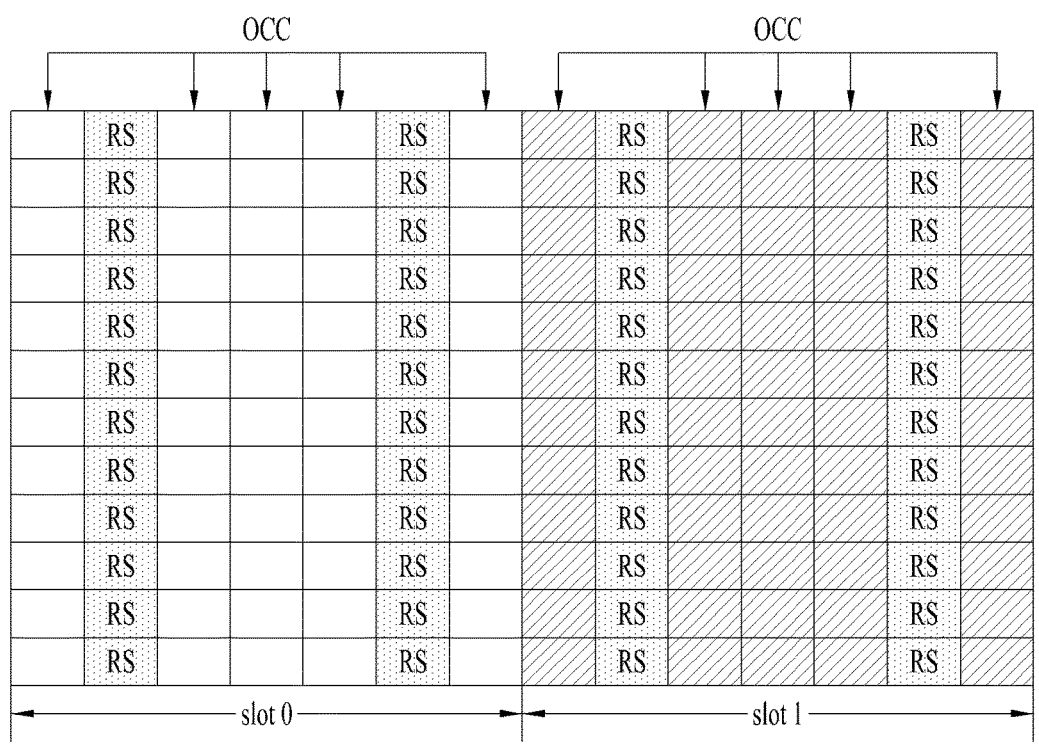
FIG. 19 is a diagram schematically illustrating the structure of PUCCH format 3 in an LTE system.

As shown in FIG. 19, in the case of PUCCH format 3 supported by the legacy LTE system, a data symbol subjected to Discrete Fourier Transform spreading (DFT) over 12 subcarriers is repeatedly transmitted over 5 symbols in each slot, and is multiplied by a length 5 OCC in the time domain. Accordingly, up to five UEs may be subjected to CDM. Then, 48 coding bits may be transmitted in one RB pair since one QPSK (Quadrature Phase Shift Keying) symbol is transmitted per RE.

Figure 20:
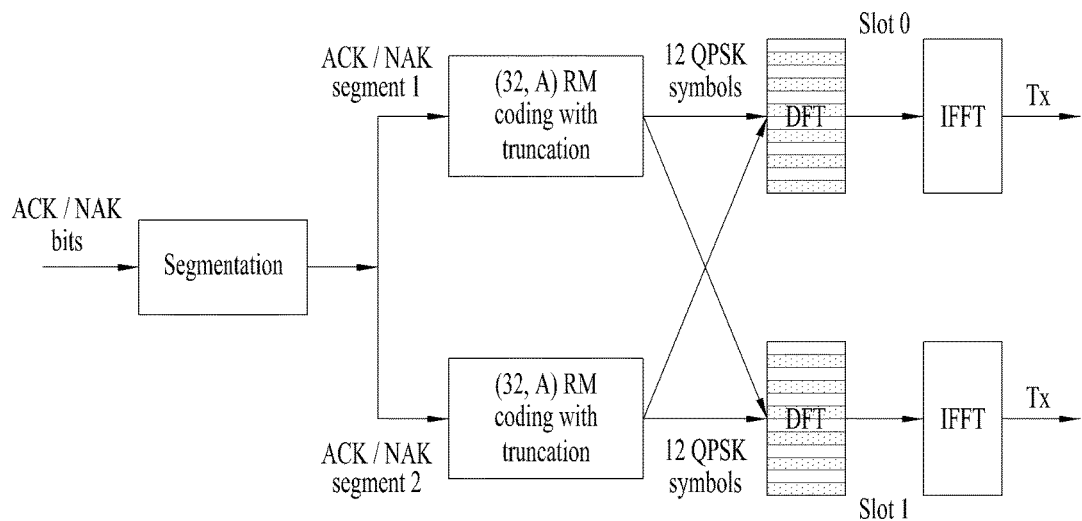
FIGS. 20 and 21 are diagrams schematically illustrating a transmission method of PUCCH format 3 in an LTE system.
Figure 21:
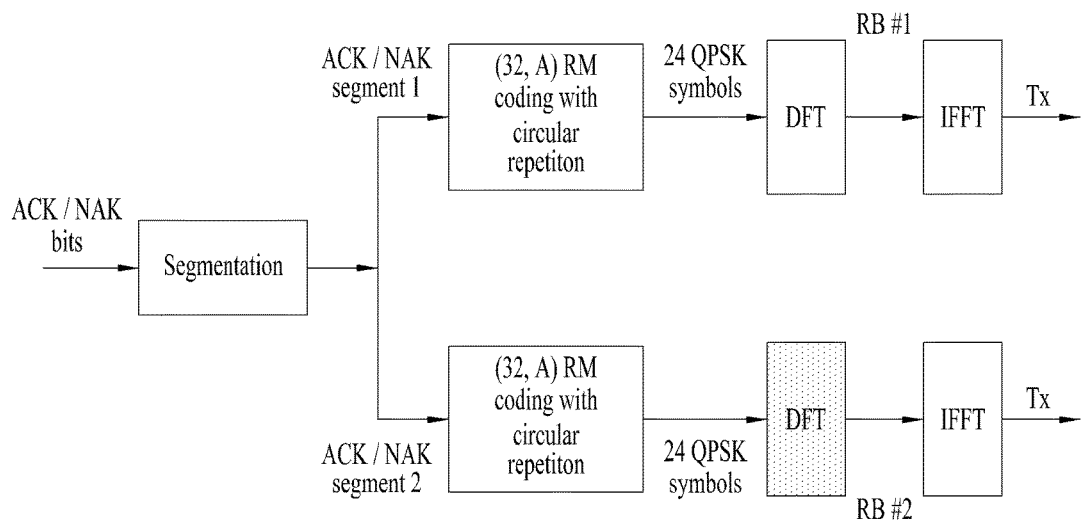

FIGS. 20 and 21 are diagrams schematically illustrating a transmission method of PUCCH format 3 in an LTE system.

First, in encoding 48 coding bits, a different channel coding method is defined according to the number of transmission bits.

Specifically, if the input bitstream is 11 bits or less, the UE generates 48 coding bits through circular repetition after (32, A) single RM coding.

Alternatively, if the input bit stream is more than 11 bits and less than or equal to 21 bits, the UE uses a dual RM code, divides the input bit stream into two segments as shown in FIG. 20, and then creates 24-bit information through truncation after (32, A) RM coding of each segment. Subsequently, the UE performs symbol interleaving on the 24 bits output for each segment, and then transmits the corresponding information in each slot.

Alternatively, a UE for which only OFDM is configured without DFT may perform symbol interleaving on 24 bits output for each segment as shown in FIG. 21, and then transmit the corresponding information by performing (applying) IFFT.

As described above, multiplexing between a UE employing OFDM and a UE employing DFTS-OFDM may still be possible because PUCCH format 3 of the LTE system is multiplied by a length 5 OCC in the time domain.

Figure 22:
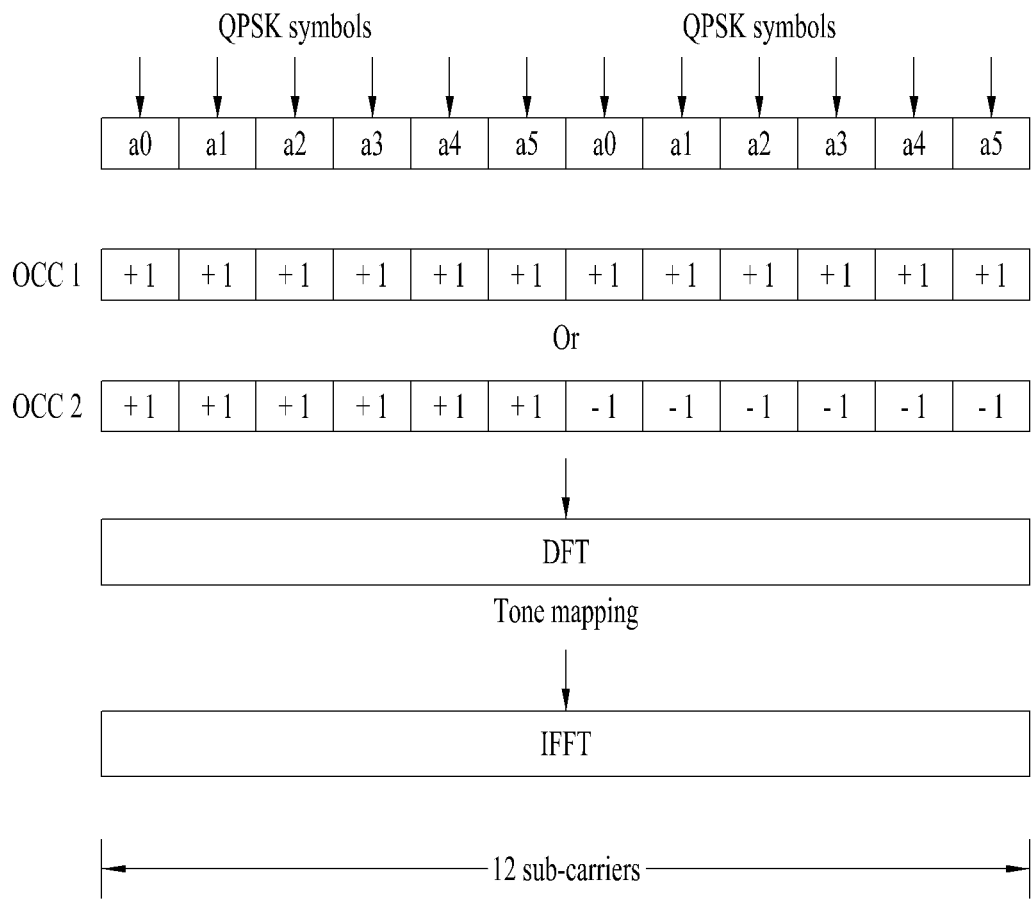
FIGS. 22 and 23 are diagrams schematically illustrating the structure of PUCCH format 5 in an LTE system.
Figure 23:
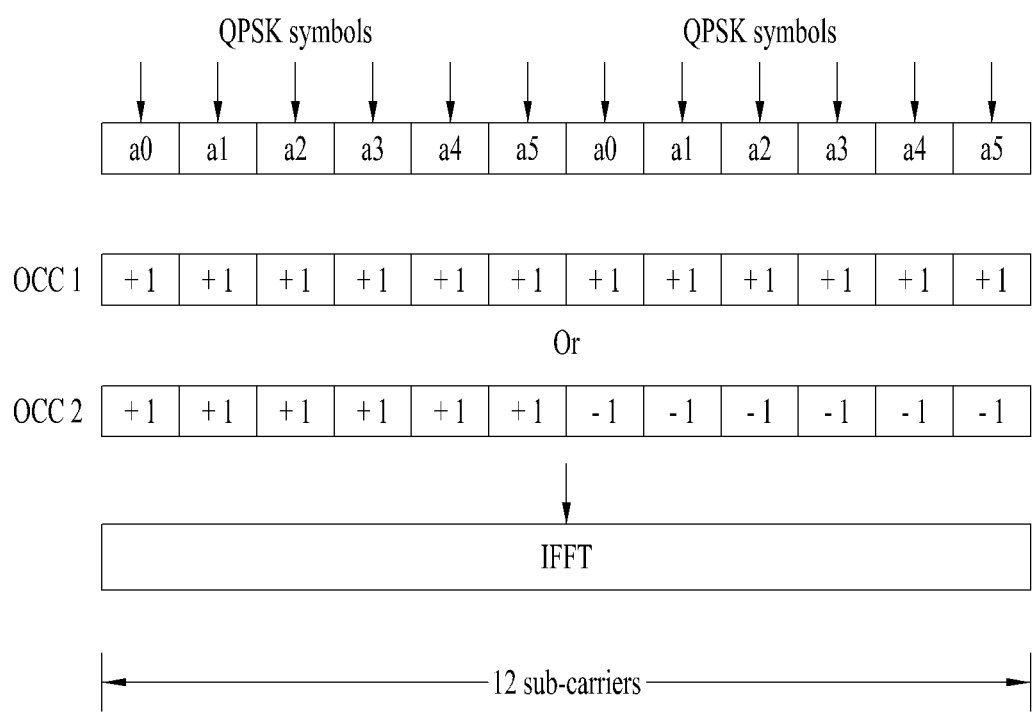

FIGS. 22 and 23 are diagrams schematically illustrating the structure of PUCCH format 5 in an LTE system.

As shown in FIGS. 22 and 23, in the case of PUCCH format 5 supported by the legacy LTE system, the PUCCH structure is configured only on the 1-RB basis, and a length 2 OCC is applied by dividing 1 PRB into 6 subcarrier units in the frequency domain. In this case, a PUCCH according to PUCCH format 5 may carry HARQ-ACK information over 72 REs. In addition, for the PUCCH according to PUCCH format 5, up to two UEs may be subjected to CDM (see FIG. 22).

Alternatively, a UE for which only OFDM is configured without DFT may transmit the PUCCH according to PUCCH format 5 as shown in FIG. 23.

For a UE for which DFTS-OFDM is configured, the OCC is multiplied at the front end of the DFT (e.g., before application of DFT). On the other hand, for the UE for which OFDM is configured, the OCC is multiplied at the IFFT front end (e.g., before application of IFFT). Therefore, if CDM is performed on the UE employing DFTS-OFDM and the UE employing OFDM, orthogonality may not be maintained from the perspective of the receiving gNB.

Therefore, in the case of PUCCH format 5, multiplexing between the UE employing OFDM and the UE employing DFTS-OFDM may not be supported. Therefore, whether to apply OFDM or DFTS-OFDM may be separately configured. This configuration method will be described in detail in section 4.1.

The multi-symbol PUCCH according to the present invention and/or a PUCCH according to variation of the PUCCH of the LTE system, which will be described later, may be configured to always be transmitted over all symbols of a subframe or a slot considering a cell edge UE. In this case, a UE for which PUCCH transmission is configured as above may recognize that the subframe or slot in which PUCCH transmission is configured consists of only UL resources. In other words, the UE may not perform DL control monitoring in the subframe or slot in which PUCCH transmission is configured.

On the other hand, during the corresponding subframe or slot, the gNB may transmit a DL control signal or the like to schedule urgent data. In this case, the gNB may not receive the PUCCH for the time for transmitting the DL control signal and/or the time for switching from transmission to reception (Tx-to-Rx switching). In other words, the gNB may receive the PUCCH after puncturing the PUCCH during the aforementioned time interval.

In this context, the RS for PUCCH transmission may be configured to be transmitted after the time region for the DL control signal and/or Tx-to-Rx switching. In one example, if the time region for the DL control signal and/or Tx-to-Rx switching has two symbols, the RS for the corresponding PUCCH may be configured to be transmitted at least in the third symbol (or a symbol coming thereafter).

Hereinafter, a detailed description will be given of a method for transmitting, by a UE, a variation of the PUCCH structure of the LTE system (e.g., a shortened format) when the UL control region is configured to be smaller than 1 slot or subframe.

3.3.1. Shortened PUCCH Format 1

Figure 24:
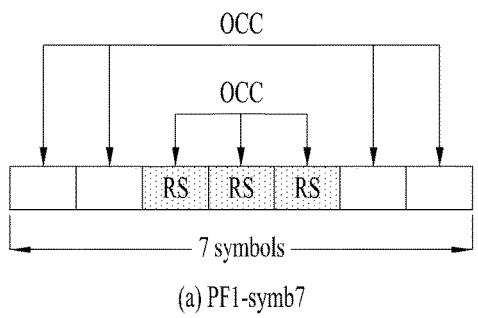
FIG. 24 is a diagram schematically illustrating a 7-symbol PUCCH transmission method according to the present invention.

FIG. 24 is a diagram schematically illustrating a 7-symbol PUCCH transmission method according to the present invention.

As shown in FIG. 24, for the 7-symbol PUCCH according to the present invention, similar to PUCCH formats 1/1a/1b in the LTE system, a demodulation reference signal (DM-RS) is transmitted over three symbols among the 7 symbols and HARQ-ACK is transmitted over the remaining four symbols. For the symbols over which the HARQ-ACK is transmitted, a length 12 CAZAC sequence is multiplied by modulated HARQ-ACK symbols and then IFFT-transformed to transmit HARQ-ACK. Here, Binary Phase Shift Keying (BPSK) modulation may applied if HARQ-ACK is 1 bit long, and QPSK modulation may be applied if HARQ-ACK is 2 bits long.

To allow more UEs to be subjected to CDM in the same resource, HARQ-ACK information may be configured identically over 4 symbols, multiplied by a length 4 OCC in the time domain and then transmitted. When a maximum of 12 cyclic shifts (CSs) of the length 12 CAZAC sequence is used, and a length 3 OCC of the DM-RS is considered, up to 36 UEs may simultaneously transmit HARQ-ACK using the PUCCH structure described above.

When the PUCCH applicable to the present invention is transmitted over 6 symbols based on such technical features, one of two methods described below may be used to transmit the PUCCH.

Figure 25:
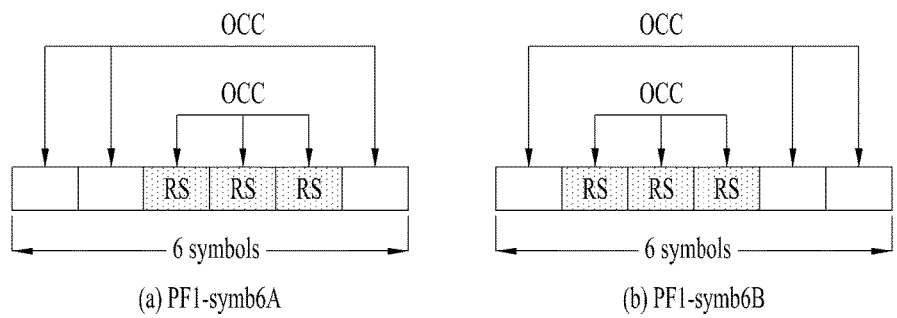
FIG. 25 is a diagram schematically illustrating a 6-symbol PUCCH transmission method according to the present invention.

FIG. 25 is a diagram schematically illustrating a 6-symbol PUCCH transmission method according to the present invention.

As shown in FIG. 25, when a 6-symbol PUCCH is applied, each of the HARQ-ACK symbol and the DM-RS symbol may consist of 3 symbols. The PUCCH may be transmitted by applying a length 3 OCC to each of the HARQ-ACK symbol and the DM-RS symbol.

Figure 26:
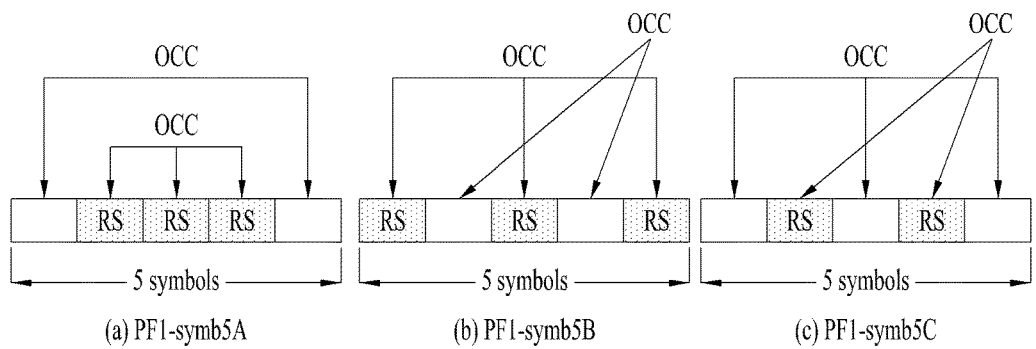
FIG. 26 is a diagram schematically illustrating a 5-symbol PUCCH transmission method according to the present invention.

FIG. 26 is a diagram schematically illustrating a 5-symbol PUCCH transmission method according to the present invention.

As shown in FIG. 26, a 5 symbol PUCCH according to the present invention may be transmitted using one of the following three methods.

As shown in FIG. 26, for the 5-symbol PUCCH, the HARQ-ACK symbol and the DM-RS symbol may consist of 2 symbols and 3 symbols, respectively (in the case of PF1-symb5A or PF1-symb5B in FIG. 26), or may consist of 3 symbols and 2 symbols, respectively (in the case of PF1-symb5C in FIG. 26). Here, in the case of PF1-symb5A or PF1-symb5B, a length 2 OCC may be applied to the HARQ-ACK symbol and a length 3 OCC may be applied to the DM-RS symbol. In the case of PF1-symb5C, a length 3 OCC may be applied to the HARQ-ACK symbol and a length 2 OCC may be applied to the DM-RS symbol.

As described above, when one slot or subframe consists of 7 symbols and only 5 or 6 symbols of the 7 symbols are configured as a UL control region, the PUCCH may be transmitted according to the methods illustrated in FIGS. 25 and 26.

One slot or subframe may be composed of 14 symbols. In this case, when only some of the 14 symbols are configured as a UL control region, a PUCCH structure applicable to the present invention may be configured by combining the methods illustrated in FIGS. 24 to 26.

In one example, if the UL control region has 13 symbols, the PUCCH structure applicable to the present invention may be configured in the form of PF1-symb7+PF1-symb6A or PF1-symb6B+PF1-symb7.

In another example, if the UL control region has 12 symbols, the PUCCH structure applicable to the present invention may be configured in the form of PF1-symb7+PF1-symb5(A or B or C), PF1-symb5(A or B or C)+PF1-symb7, or PF1-symb6B+PF1-symb6A.

In another example, if the UL control region has 11 symbols, the PUCCH structure applicable to the present invention may be configured in the form of PF1-symb6B+PF1-symb5(A or B or C) or PF1-symb5(A or B or C)+PF1-symb6A.

In another example, if the UL control region has 10 symbols, the PUCCH structure applicable to the present invention may be configured in the form of PF1-symb5(A or B or C)+PF1-symb5(A or B or C).

3.3.2. Shortened PUCCH Format 3

Figure 27:
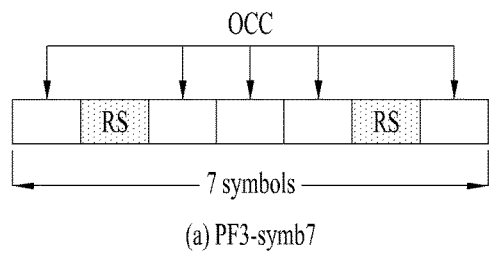
FIG. 27 is a diagram illustrating a 7-symbol PUCCH transmission method according to the present invention.

FIG. 27 is a diagram illustrating a 7-symbol PUCCH transmission method according to the present invention.

As shown in FIG. 27, in the case of the 7-symbol PUCCH according to the present invention, a DM-RS may be transmitted over 2 symbols out of the 7 symbols and HARQ-ACK may be transmitted over the remaining 5 symbols, similar to the case of PUCCH format 3 in the LTE system. At this time, a length 5 OCC may be applied to the symbols over which the HARQ-ACK is transmitted.

Figure 28:
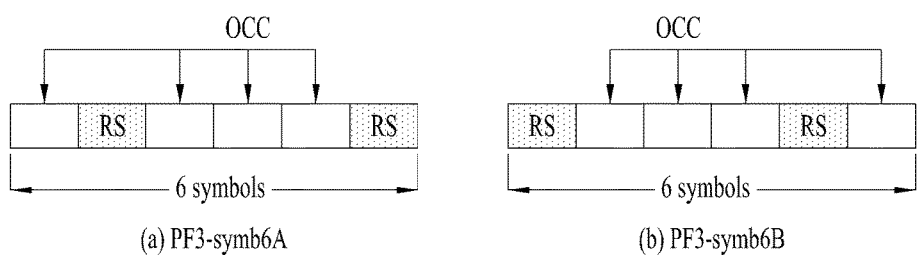
FIG. 28 is a diagram schematically illustrating a 6-symbol PUCCH transmission method according to the present invention.

FIG. 28 is a diagram schematically illustrating a 6-symbol PUCCH transmission method according to the present invention.

As shown in FIG. 28, the 6-symbol PUCCH according to the present invention may be transmitted according to one of the following two methods. A length 4 OCC may be applied to the HARQ-ACK symbols. Thus, as a CS value for the DM-RS, {0, 3, 6, 9} or a value obtained by applying the same offset value to {0, 3, 6, 9} (e.g., when the offset value is 1, {1, 4, 7, 10}) may be set to be applied.

Figure 29:
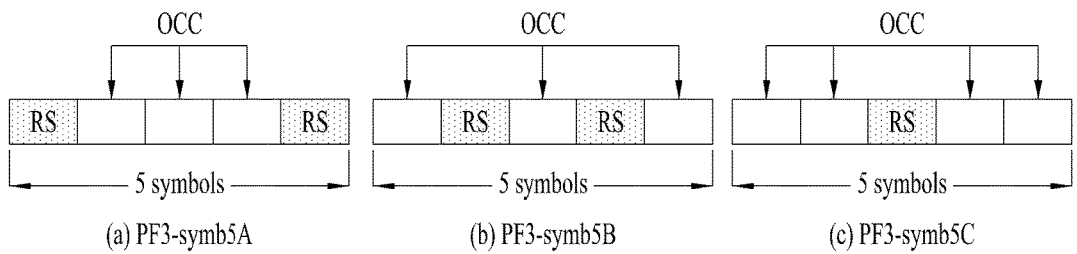
FIG. 29 is a diagram schematically illustrating a 5-symbol PUCCH transmission method according to the present invention.

FIG. 29 is a diagram schematically illustrating a 5-symbol PUCCH transmission method according to the present invention.

As shown in FIG. 29, the 5-symbol PUCCH according to the present invention may be transmitted according to one of the following three methods. In the case of PF3-symb5A or PF3-symb5B, a length 3 OCC may be applied to the HARQ-ACK symbol. Therefore, as a CS value for the DM-RS, {0, 4, 8} or a value obtained by applying the same offset value to {0, 4, 8} (e.g., when the offset value is 1, {1,5,9}) may be set to be applied. In the case of PF3-symb5C, a length 4 OCC may be applied to the HARQ-ACK symbol. Thus, as a CS value for the DM-RS, {0, 3, 6, 9} or a value obtained by applying the same offset value to {0, 3, 6, 9} (e.g., when the offset value is 1, {1, 4, 7, 10}) may be set to be applied.

As described above, when one slot or subframe consists of 7 symbols and the region of only 5 or 6 symbols of the 7 symbols is set as a UL control region, the PUCCH may be transmitted according to the methods illustrated in FIGS. 28 and 29.

One slot or subframe may be composed of 14 symbols. In this case, when only some of the 14 symbols are configured as a UL control region, a PUCCH structure applicable to the present invention may be configured by combining the methods illustrated in FIGS. 27 to 29.

In one example, if the UL control region has 13 symbols, the PUCCH structure applicable to the present invention may be configured in the form of PF3-symb7+PF3-symb6A or PF3-symb6B+PF3-symb7.

In another example, if the UL control region has 12 symbols, the PUCCH structure applicable to the present invention may be configured in the form of PF3-symb7+PF3-symb5(A or B or C), PF3-symb5(A or B or C)+PF3-symb7, or PF3-symb6B+PF3-symb6A.

In another example, if the UL control region has 11 symbols, the PUCCH structure applicable to the present invention may be configured in the form of PF3-symb6B+PF3-symb5(A or B or C) or PF3-symb5(A or B or C)+PF3-symb6A.

In another example, if the UL control region has 10 symbols, the PUCCH structure applicable to the present invention may be configured in the form of PF3-symb5(A or B or C)+PF3-symb5(A or B or C).

3.3.3. Shortened PUCCH Format 4/5

FIG. 30 is a diagram schematically illustrating a 7-symbol PUCCH transmission method according to the present invention.

As shown in FIG. 30, in the case of a 7-symbol PUCCH according to the present invention, similarly to PUCCH formats 4/5 in the LTE system, data transformed with a coding bit is transmitted over 6 symbols out of 7 symbols and the RS is transmitted in the remaining symbol.

FIG. 31 is a diagram schematically illustrating a 6-symbol PUCCH transmission method according to the present invention.

As shown in FIG. 31, a 6-symbol PUCCH according to the present invention may be transmitted according to one of the following two methods. The RS symbol may be positioned at the fourth or third symbol in the time domain, as shown in PF4/5-symb6A or PF4/5-symb6B in FIG. 31.

FIG. 32 is a diagram schematically illustrating a 5-symbol PUCCH transmission method according to the present invention.

As shown in FIG. 32, a 5 symbol PUCCH according to the present invention may be transmitted according to one of the following three methods. The RS symbol may be positioned at the fourth, second, or third symbol in the time domain, as shown in PF4/5-symb5A, PF4/5-symb5B or PF4/5-symb5C in FIG. 31.

As described above, when one slot or subframe consists of 7 symbols and only 5 or 6 symbols of the 7 symbols are configured as a UL control region, the PUCCH may be transmitted according to the methods illustrated in FIGS. 31 and 32.

One slot or subframe may be composed of 14 symbols. In this case, when only some of the 14 symbols are configured as a UL control region, a PUCCH structure applicable to the present invention may be configured by combining the methods illustrated in FIGS. 30 to 32.

In one example, if the UL control region has 13 symbols, the PUCCH structure applicable to the present invention may be configured in the form of PF4/5-symb7+PF4/5-symb6A or PF4/5-symb6B+PF4/5-symb7.

In another example, if the UL control region has 12 symbols, the PUCCH structure applicable to the present invention may be configured in the form of PF4/5-symb7+PF4/5-symb5(A or B or C), PF4/5-symb5(A or B or C)+PF4/5-symb7 or PF4/5-symb6B+PF4/5-symb6A.

In another example, if the UL control region has 11 symbols, the PUCCH structure applicable to the present invention may be configured in the form of PF4/5-symb6B+PF4/5-symb5(A or B or C) or PF4/5-symb5(A or B or C)+PF4/5-symb6A.

In another example, if the UL control region has 10 symbols, the PUCCH structure applicable to the present invention may be configured in the form of PF4/5-symb5(A or B or C)+PF4/5-symb5(A or B or C).

Hereinafter, additional configurations applicable in determining or configuring the PUCCH structures described above will be described in detail.

4. Additional Features 4.1. OFDM or DFTS-OFDM Configuration Method

In the legacy LTE system, the UE is configured to perform UL transmission by applying DFTS-OFDM conversion (modulation) in order to reduce the PAPR of the UE. However, in the NR system to which the present invention is applicable, not only DFTS-OFDM but also OFDM may be supported for UL transmission of the UE. Therefore, a multiplexing technique to be applied to perform PUCCH transmission needs to be configured for the UE.

A multiplexing technique (i.e., OFDM or DTFS-OFDM) to be used for each UE to transmit a PUCCH may be predetermined for each component carrier (CC) and/or for each PUCCH resource that is actually transmitted and/or a transmitted PUCCH format or may be configured by RRC signaling.

Alternatively, a multiplexing technique (i.e., OFDM or DTFS-OFDM) to be used for each UE to transmit a PUCCH may be dynamically configured by L1 signaling. For example, for a symbol for FDM of an RS and UCI or a PUCCH on which the RS and the UCI are transmitted in an FDM PUCCH structure, the UE may be configured not to perform DFT spreading in UCI transmission or configured to transmit a PR sequence (when transmitting the UCI and the RS).

In addition, for a symbol on which only UCI is transmitted or a PUCCH on which the RS and the UCI are transmitted in a PUCCH structure in which the RS and the UCI are subjected to TDM, the UE may be configured to transmit the UCI after DTF spreading is performed or to transmit a ZC sequence (when transmitting the UCI and the RS).

Additionally, the gNB may signal the following information to the UE. Here, an implicit linkage with a configuration about the multiplexing technique that the UE uses may be configured for the following information.

Whether the PUCCH DM-RS is a Zadoff-Chu sequence or a pseudo-random (PR) (or computer generated) sequence Cyclic shift (CS) and/or orthogonal cover code (OCC) information or scrambling seed information Whether a phase tracking RS (PTRS) is transmitted, wherein the PTRS may be transmitted in order to facilitate channel estimation considering high mobility, frequency/phase/time tracking between a base station and a UE or phase noise of an oscillator.

The position/density of a resource in which the PTRS is to be transmitted and/or the sequence information about the signal 4.1.1. Example 1

The gNB may indicate to the UE whether the PUCCH DM-RS is a ZC sequence or a PR sequence through a specific first field on the higher layer signaling or L1 signaling through which the configuration for PUCCH DM-RS transmission is indicated.

In addition, the gNB may signal cyclic shift (CS) and/or orthogonal cover code (OCC) information or scrambling seed information to the UE through specific signaling (e.g., a second field, etc.). If the UE receives signaling indicating that the PUCCH DM-RS is a ZC sequence, the UE may interpret the information through the specific signaling of the gNB as CS and/or OCC information. On the other hand, if the UE receives signaling indicating that the PUCCH DM-RS is a PR sequence, the UE may interpret the information through the specific signaling of the gNB as scrambling seed information.

In summary, depending on whether the ZC sequence or the PR sequence is indicated through the first field described above, the UE may interpret the information indicated through the second field differently.

4.1.2. Example 2

Whether the PUCCH DM-RS is a ZC sequence or a PR sequence may not be separately signaled, and a sequence type applied to the DM-RS may be pre-configured according to a multiplexing technique for PUCCH transmission.

For example, if the UE transmits a PUCCH based on OFDM, the UE may transmit the DM-RS using the PR sequence. Alternatively, if the UE transmits a PUCCH based on DFTS-OFDM, the UE may transmit the DM-RS using the ZC sequence.

At this time, if the gNB signals CS and/or OCC information or scrambling seed information through a specific field in the higher layer signaling or L1 signaling through which the configuration for PUCCH DM-RS transmission is indicated, a UE for which DFTS-OFDM-based PUCCH transmission is configured may interpret the information as CS and/or OCC information about the ZC sequence, and a UE for which OFDM-based PUCCH transmission is configured may interpret the information as scrambling seed information about the PR sequence.

4.1.3. Example 3

Whether the PTRS is transmitted may be pre-configured according to the multiplexing technique for PUCCH transmission. For example, if the PUCCH is transmitted based on OFDM, PTRS transmission may be additionally configured. At this time, CS and/or OCC information, scrambling seed information, or the position/density about a resource in which the PTRS is to be transmitted and/or PTRS sequence information may be signaled through a specific field in higher layer signaling or L1 signaling through which a configuration for PUCCH RS transmission is indicated. In this case, a UE for which DFTS-OFDM-based PUCCH transmission is configured may interpret the corresponding information as the CS and/or OCC information about the ZC sequence, and a UE for which OFDM-based PUCCH transmission is configured may interpret the corresponding information as the scrambling seed information, or the position/density about a resource in which the PTRS is to be transmitted and/or PTRS sequence information.

4.2. UL REG, UL CCE, and PUCCH Configuration Methods

Methods for configuring the Resource Element Group (UL REG), the UL Control Channel Element (CCE), and the PUCCH configuration have been described above in brief. In this section, the UL REG, UL CCE, and PUCCH configuration methods will be described in detail. How to apply the configuration methods to the one-symbol PUCCH, the multi-symbol PUCCH, and the variation of the PUCCH of the LTE system will also be described in detail.

4.2.1. UL REG

One UL REG may be defined as K consecutive subcarriers (or resource elements (REs)) within the same symbol. For example, K may be 12 or an integer multiple of 12. One UL REG may be composed of only RS, only UCI, or a combination of the RS and the UCI.

Depending on the size of the UCI payload, the number of REs constituting the UL REG may be set differently. Specifically, the larger the UCI payload, the larger the number of REs constituting one UL REG may be. Alternatively, as the size of the UCI payload increases, a PUCCH resource consisting of more REs may be configured. For example, if the UCI payload is less than or equal to X bits, 12 REs may be defined as one UL REG. If the UCI payload is greater than X bits, 48 REs may be defined as one REG.

One UL REG may be defined over several symbols rather than one symbol. In this case, as described above, the number of REs constituting the UL REG may be correlated with the size of the UCI payload. For example, if the UCI payload size is less than or equal to Y bits, the UL REG may be configured over one symbol. If the UCI payload size is greater than Y bits, the UL REG may be configured over two symbols.

At this time, the total number of REs constituting one UL REG may be set to remain the same. For example, when one UL REG is composed of 48 REs, a UL REG transmitted over two symbols may be composed of 24 consecutive REs per symbol, and a UL REG transmitted over four symbols may be composed of 12 consecutive REs per symbol.

Alternatively, a different rule may be configured depending on the number of REs constituting the UL REG. For example, when the number of REs constituting one UL REG is less than or equal to Q (e.g., Q=12), the number of REs for each symbol of the UL REG may be maintained to be Q even if the UL REG is transmitted over several symbols.

In a method for configuring a UL REG and a UL CCE for a PUCCH resource composed of N symbols, one UL REG may be composed of one symbol, and a t-CCE may be configured to extend the PUCCH configuration into N symbols as described below in section 4.2.2.

Alternatively, one UL REG may be composed of N symbols, and an f-CCE may be configured so as to be mapped to a localized structure or a distributed structure to configure a PUCCH resource as described below in section 4.2.2.

Alternatively, if one UL REG is composed of several symbols whose number is less than N, and a 2D-CCE is configured as described below in section 4.2.2, the PUCCH configuration may be extended to N symbols in the time domain and be mapped to a localized structure or a distributed structure in the frequency domain.

For example, when one UL REG is composed of two symbols for a PUCCH resource composed of four symbols, the PUCCH configuration may be set by extending two corresponding UL REGs in the time domain and extending the same in the form of a 2D-CCE which is extended in the form of a localized structure or a distributed structure in the frequency domain.

4.2.2. UL CCE

One UL CCE may be composed of L UL REGs. For example, L may be set to one of 6, 7, 8, 12, 14, and 16.

4.2.2.1. Example 1

One UL CCE may be composed of L UL REGs (on different frequency resources) within the same symbol. Hereinafter, for simplicity of explanation, this UL CCE is defined as an f-CCE. Here, the L UL REGs may be mapped to either a localized structure or a distributed structure (within a system bandwidth or a specific subband). An example of the PUCCH structure according to Example 1 may correspond to the one-symbol PUCCH described above.

4.2.2.2. Example 2

One UL CCE may be composed of L UL REGs (on the same frequency resource) in different symbols. Hereinafter, for simplicity of explanation, this UL CCE is defined as a t-CCE. The L UL REGs may be fixed (in the system bandwidth or a specific subband) or be subjected to frequency hopping. An example of the PUCCH structure according to Example 2 may be the variant of the PUCCH of the LTE system or a PUCCH transmitted over the entire subframe or slot among the multi-symbol PUCCHs described above.

4.2.2.3. Example 3

One UL CCE may be composed of L UL REGs belonging to a combination of m symbols and n UL REG frequency resource regions. Here, m and n may be equal to or different from each other, and may be integers greater than 1. Hereinafter, for convenience of description, this UL CCE is defined as a 2D-CCE. Accordingly, L=m*n may be set (e.g., {L=6, m=2, n=3}, {L=6, m=3, n=2}, {L=8, m=2, n=4}, {L=8, m=4, n=2}, {L=12, m=2, n=6}, {L=12, m=3, n=4}, {L=12, m=4, n=3}, {L=12, m=6, n=2}, {L=16, m=2, n=8}, {L=16, m=4, n=4}, {L=16, m=8, n=2}), where L UL REGs may be configured in the form of a localized structure or a distributed structure (in the system bandwidth or a specific subband). However, there may be a restriction that the frequency positions of the UL REGs positioned in the respective symbol must be the same. In addition, the L UL REGs may be fixed in the system bandwidth or a specific subband in the frequency domain, or be subjected to frequency hopping.

In Examples 1 to 3 described above, L, which is the number of UL REGs constituting one UL CCE may be set to the same value for all cases (e.g., Examples 1 to 3), set to a different value (e.g., 8 or 16 in Example 1, 6 or 12 in Example 2, and 7 or 14 in Example 3) for each case (e.g., Examples 1 to 3), or set to the same value only for specific cases (e.g., 6, 8, 12 or 16 in Examples 1 and 2, and 7 or 14 in Example 3)

In configuring the UL CCE, the number of specifically configured UCI transmission REs may be limited to $2^n$ (or $2^n*3^k*5^j$). With this configuration, the UCI may be transmitted on the PUCCH without additional puncturing or rate matching, considering that polar code transmission is suitable for $2^n$ coding bits.

4.2.3. PUCCH

One PUCCH may be composed of one UL CCE or a plurality of UL CCEs.

If the UL CCE is an f-CCE described in section 4.2.2, one PUCCH may be composed of a plurality of f-CCEs (at different frequencies) in the same symbol. Additionally, one PUCCH may be composed of a plurality of f-CCEs (at the same frequency) in different symbols (i.e., as in the case of a multi-symbol PUCCH).

If the UL CCE is a t-CCE described in section 4.2.2, one PUCCH may be composed of a plurality of t-CCEs (at the same frequency or different frequencies) within different symbol intervals (e.g., slots). Additionally, one PUCCH may be composed of a plurality of t-CCEs (which are consecutive or non-consecutive in the frequency domain) within the same symbol interval (e.g., slot).

If the UL CCE is a 2D-CCE described in section 4.2.2, one PUCCH may be composed of a plurality of 2D-CCEs (at the same frequency or different frequencies) within different symbol intervals (e.g., slots). Additionally, one PUCCH may be composed of a plurality of 2D-CCEs (which are consecutive or non-consecutive in the frequency domain) within the same symbol interval (e.g., slot). One PUCCH may be composed of a plurality of 2D-CCEs in different symbol intervals and at different frequencies. In addition, one PUCCH may be composed of a plurality of 2D-CCEs in symbol intervals, some of which overlap, and in frequency resources, some of which overlap.

4.2.4. Sequence Generation Method

As described above, in configuring UL REGs or UL CCEs, some REs may be configured for RS, and some REs may be configured for UCI. Here, the UCI may be transmitted in the form of a sequence or a coding symbol depending on the type thereof. Hereinafter, a detailed description will be given of a method for generating and transmitting a sequence when a UE transmits RS or sequence-based UCI.

4.2.4.1. Zadoff-Chu Sequence-based Transmission Method

When UCI is transmitted on the basis of the Zadoff-Chu sequence, a sequence having a different root index may be set for each UL REG or for each symbol. Alternatively, the CS value may be set differently for each UL REG or for each symbol (while the root index is the same). In this case, only one root index (or cyclic shift) value may be set (by L1 signaling or higher layer signaling), and a sequence corresponding to the value may be transmitted in a pre-configured REG (or symbol). For a sequence transmitted in other REGs (or symbols), the root index (or cyclic shift) value may be determined by a predefined rule.

For example, when a root index (or cyclic shift) value is signaled through the DCI, a sequence based on the value may be transmitted in an REG including an RB having the lowest (or highest) RB index, and a sequence based on a root index (or cyclic shift) value obtained by adding a preset offset value to the signaled value may be transmitted in an REG including an RB having the next highest (or next lowest) RB index.

4.2.4.2. Pseudo Random Sequence-based Transmission Method

When UCI is transmitted based on a pseudo random sequence, a sequence having a different scrambling seed may be configured for each UL REG or for each symbol. Alternatively, the UCI may be configured to be transmitted through an OCC after repeating the same sequence in each UL REG or each symbol. Thereby, CDM between UEs may be supported.

In this case, only one scrambling seed value may be set (by L1 signaling or higher layer signaling), and a sequence corresponding to the value may be transmitted in a pre-configured REG (or symbol). For a sequence transmitted in other REGs (or symbols), the scrambling seed value may be determined by a predefined rule.

For example, when a scrambling seed value is signaled through the DCI, a sequence based on the value may be transmitted in an REG including an RB having the lowest (or highest) RB index, and a sequence based on a scrambling seed value obtained by adding a preset offset value to the signaled value may be transmitted in an REG including an RB having the next highest (or next lowest) RB index.

Figure 33:
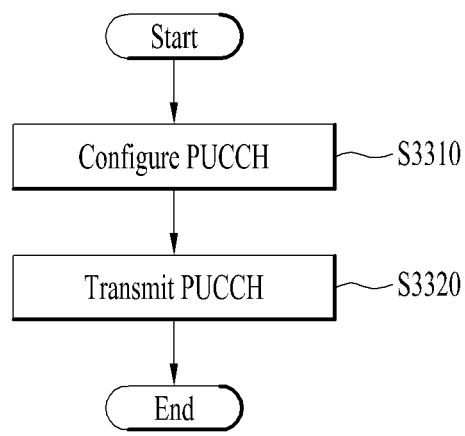
FIG. 33 is a flowchart illustrating a PUCCH transmission method of a terminal according to the present invention.

FIG. 33 is a flowchart illustrating a PUCCH transmission method of a UE according to the present invention.

First, the UE configures a PUCCH to be transmitted (S3310). Here, the PUCCH structure configured by the UE may be determined based on the size of the UCI payload to be transmitted by the UE, signaling (e.g., L1 signaling or RRC signaling) from the base station, and the like. For example, the UE may configure the PUCCH according to the structure of the one-symbol PUCCH, multi-symbol PUCCH, and variation of the PUCCH of the LTE system described above.

In a specific example, when the UE configures a multi-symbol PUCCH to be transmitted through a plurality of symbols, the UE may use a plurality of PUCCH configurations each using one symbol to configure the multi-symbol PUCCH as shown in FIG. 12(*a*). That is, the UE may configure the multi-symbol PUCCH by repeating a plurality of one-symbol PUCCH structures in the time domain.

The PUCCH configuration using one symbol described above may be a PUCCH configuration in which a demodulation reference signal (DM-RS) and uplink control information (UCI) are transmitted through one symbol.

As the PUCCH configuration using one symbol, a PUCCH configuration in which a DM-RS and UCI are transmitted through one symbol by applying frequency division multiplexing (FDM) thereto may be used, as shown in FIG. 11(*a*). In addition, the PUCCH configuration using one symbol may be a PUCCH configuration in which a DM-RS and UCI are transmitted through one symbol by applying time division multiplexing (TDM) thereto, as shown in FIG. 11(*b*).

In addition, when the PUCCH configuration using one symbol is composed of a plurality of UL resource element groups (REGs) allocated to non-consecutive frequency resources, frequency hopping for the multi-symbol PUCCH may not be allowed.

In contrast, when the PUCCH configuration using one symbol is composed of a plurality of UL resource element groups (REGs) allocated to consecutive frequency resources, frequency hopping for the multi-symbol PUCCH may be employed.

When the number of symbols through which the multi-symbol PUCCH is transmitted is K (where K is a natural number greater than 1) and the multi-symbol PUCCH is transmitted by performing frequency hopping, each frequency hopping unit may be divided into $$\left\lceil \frac{K}{2} \right\rceil$$

symbols and $$K - \left\lceil \frac{K}{2} \right\rceil$$

symbols. Here, ⌈a⌉ may denote the smallest integer among integers greater than or equal to a.

In this case, the UCI bit information transmitted in each symbol through which the multi-symbol PUCCH is transmitted may be the same or different depending on the size of the uplink control information (UCI) transmitted on the multi-symbol PUCCH.

Specifically, when the size of the uplink control information (UCI) transmitted on the multi-symbol PUCCH is larger than or equal to a predetermined bit size, different UCI bit information may be transmitted in each symbol through which the multi-symbol PUCCH is transmitted.

In addition, the multi-symbol PUCCH may be transmitted by code division multiplexing (CDM) with a PUCCH transmitted by another UE.

Then, the UE transmits the PUCCH configured in various methods to the base station through a corresponding symbol interval (S3330).

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

5. Device Configuration

Figure 34:
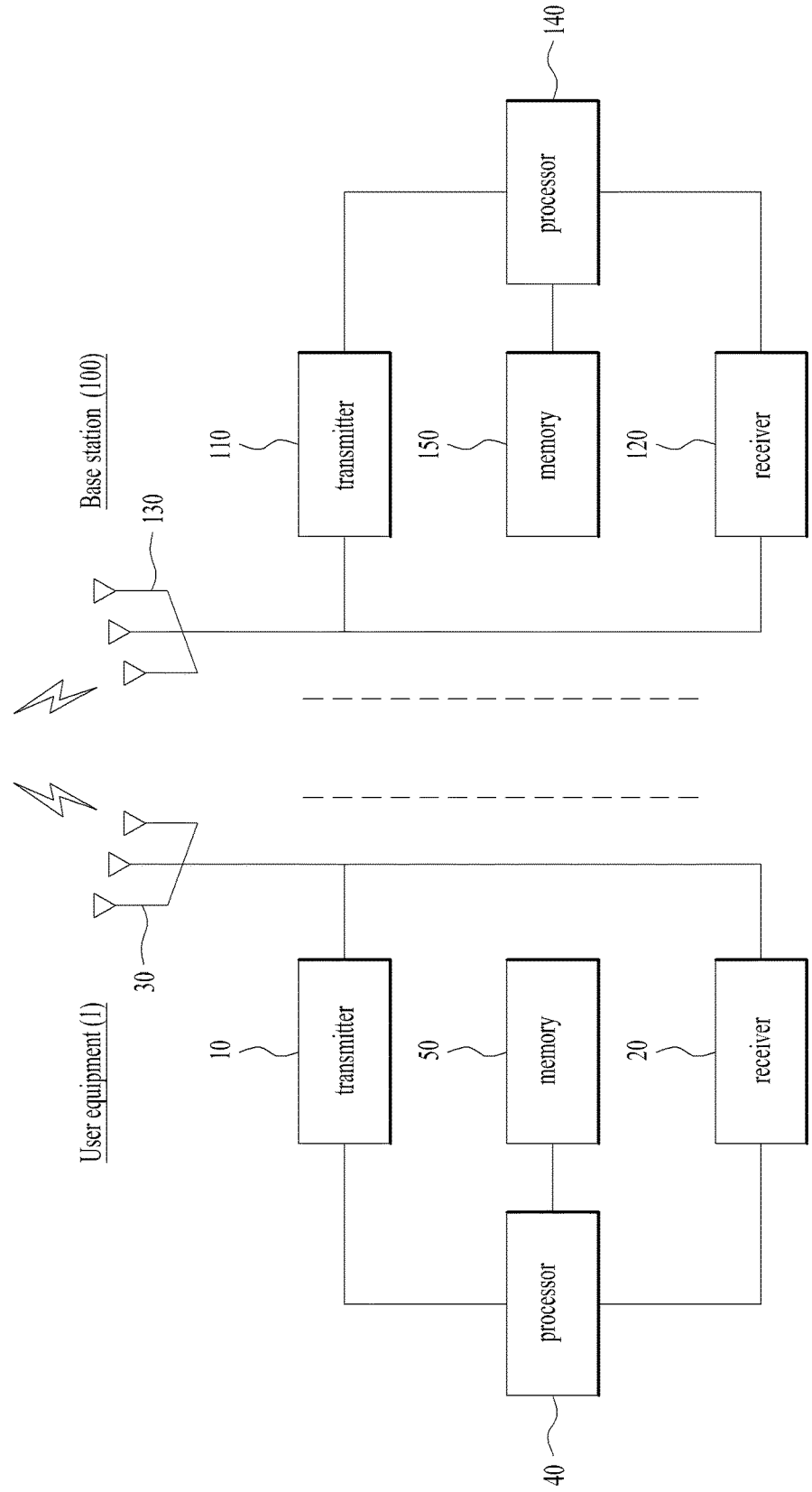
FIG. 34 is a diagram illustrating configurations of a UE and a base station capable of being implemented by the embodiments proposed in the present invention.

FIG. 34 is a diagram illustrating configurations of a UE and a base station capable of being implemented by the embodiments proposed in the present invention. The UE and the base station shown in FIG. 34 operate to implement the embodiments of the methods for transmitting and receiving a physical uplink control channel between the UE and the base station described above.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 configured as described above may configure, through the processor 40, a multi-symbol PUCCH to be transmitted through a plurality of symbols, using a plurality of PUCCH configurations each using one symbol, and transmit the configured multi-symbol PUCCH through a plurality of symbols via the transmitter.

In response, the base station 100 may receive, through the receiver 110, the multi-symbol PUCCH through a plurality of symbols from the UE 1. The multi-symbol PUCCH may be configured using a plurality of PUCCH configurations each using one symbol.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 34 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting uplink control information (UCI) through a Physical Uplink Control Channel (PUCCH) by a user equipment in a wireless communication, the method comprising:
    based on a size of the UCI being less than or equal to a threshold number of bits, and based on the PUCCH being a one-symbol PUCCH: configuring the one symbol PUCCH using a Zadoff-Chu (ZC) sequence that is configured to carry the UCI according to sequence-based selection;
    based on the size of the UCI being less than or equal to the threshold number of bits, and based on the PUCCH being a two-symbol PUCCH: configuring the two-symbol PUCCH using the ZC sequence that is configured to carry the UCI in each of two symbols according to sequence-based selection; and
    transmitting the UCI through the PUCCH.

2. The method of claim 1, wherein configuring the one symbol PUCCH comprises: configuring the one symbol PUCCH to carry a reference signal (RS).

3. The method of claim 2, wherein based on the size of the UCI being larger than the threshold number of bits, the one-symbol PUCCH structure is configured to carry both the UCI and the RS.

4. The method of claim 3, wherein the one-symbol PUCCH structure comprises a demodulation reference signal (DM-RS) and the UCI that are configured to be transmitted in a manner of frequency division multiplexing (FDM) on a single symbol.

5. The method of claim 1,
    wherein the threshold number of bits is equal to 2 bits.

6. The method of claim 1,
    wherein based on the size of the UCI being less than or equal to the threshold number of bits, the one-symbol PUCCH structure is configured to carry the UCI according to the sequence-based selection such that UCI bit information transmitted per symbol are identical.

7. The method of claim 1,
    wherein based on the size of the UCI being greater than the threshold number of bits, and based on the PUCCH being a two symbol PUCCH; UCI bit information transmitted per symbol are different from each other.

8. A method of receiving uplink control information (UCI) through a Physical Uplink Control Channel (PUCCH)

from a user equipment by a base station in a wireless communication, the method comprising:
  receiving, from the user equipment, the PUCCH; and
  obtaining the UCI from the PUCCH,
    wherein based on a size of the UCI being less than or equal to a threshold number of bits, and based on the PUCCH being a one symbol PUCCH: the one-symbol PUCCH is configured using a Zadoff-Chu (ZC) sequence that carries the UCI according to sequence-based selection, and
    based on the size of the UCI being less than or equal to the threshold number of bits, and based on the PUCCH being a two-symbol PUCCH: the two-symbol PUCCH is configured using the ZC sequence that carries the UCI in each of two symbols according to sequence-based selection.

9. A user equipment (UE) configured to transmit uplink control information (UCI) through a Physical Uplink Control Channel (PUCCH) to a base station in a wireless communication system, the UE comprising:
  a transmitter;
  at least one processor; and
  at least one computer memory operably connectable to the at least one processor and storing instructions that, when executed by the at least one processor, perform operations comprising:
    based on a size of the UCI being less than or equal to a threshold number of bits, and based on the PUCCH being a one-symbol PUCCH: configuring the one symbol PUCCH using a Zadoff-Chu (ZC) sequence that is configured to carry the UCI according to sequence-based selection;
    based on the size of the UCI being less than or equal to the threshold number of bits, and based on the PUCCH being a two-symbol PUCCH: configuring the two-symbol PUCCH using the ZC sequence that is configured to carry the UCI in each of two symbols according to sequence-based selection; and
  transmitting the UCI through the PUCCH.

10. The method of claim 1,
  wherein configuring the two-symbol PUCCH comprises:
    configuring the two-symbol PUCCH using (i) a first one-symbol PUCCH that is configured in a first of the two symbols, and (ii) a second one-symbol PUCCH that is configured in a second of the two symbols, wherein based on the size of the UCI being less than or equal to the threshold number of bits, each of the first one-symbol PUCCH and the second one-symbol PUCCH is configured according to sequence-based selection, and
  wherein transmitting the UCI through the PUCCH comprise:
    transmitting the UCI through the two-symbol PUCCH using the first one-symbol PUCCH in the first symbol and the second one-symbol PUCCH in the second symbol.

11. The method of claim 1, wherein configuring the one symbol PUCCH using the ZC sequence that is configured to carry the UCI according to the sequence-based selection comprises:
  configuring the one-symbol PUCCH using the ZC sequence, from among a plurality of ZC sequences, according to the sequence-based selection based on the UCI.

* * * * *